United States Patent
Barman et al.

(10) Patent No.: US 11,621,914 B2
(45) Date of Patent: Apr. 4, 2023

(54) MAINTAINING PROCESSING CORE AFFINITY FOR FRAGMENTED PACKETS IN NETWORK DEVICES

(71) Applicant: Juniper Networks, Inc., Sunnyvale, CA (US)

(72) Inventors: Dipankar Barman, Bangalore (IN); Chin Man Kim, Cupertino, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 112 days.

(21) Appl. No.: 17/105,008

(22) Filed: Nov. 25, 2020

(65) Prior Publication Data
US 2022/0166709 A1    May 26, 2022

(51) Int. Cl.
*H04L 45/00* (2022.01)
*H04L 45/02* (2022.01)
*H04L 67/1023* (2022.01)
*H04L 45/60* (2022.01)
*H04L 101/663* (2022.01)

(52) U.S. Cl.
CPC .............. *H04L 45/38* (2013.01); *H04L 45/02* (2013.01); *H04L 45/566* (2013.01); *H04L 45/60* (2013.01); *H04L 67/1023* (2013.01); *H04L 2101/663* (2022.05)

(58) Field of Classification Search
None
See application file for complete search history.

(56) References Cited

U.S. PATENT DOCUMENTS

| | | | | |
|---|---|---|---|---|
| 2004/0243718 | A1* | 12/2004 | Fujiyoshi | H04L 45/586 709/237 |
| 2005/0038793 | A1* | 2/2005 | Romano | H04L 47/568 |
| 2005/0053054 | A1* | 3/2005 | Das | H04L 45/60 370/352 |
| 2010/0284404 | A1* | 11/2010 | Gopinath | G06F 9/5005 370/392 |
| 2014/0126577 | A1* | 5/2014 | Post | H04L 45/60 370/400 |

OTHER PUBLICATIONS

Kent et al., "Security Architecture for the Internet Protocol," RFC 4301, Network Working Group, Dec. 2005, 101 pp.

\* cited by examiner

*Primary Examiner* — Christopher M Crutchfield
(74) *Attorney, Agent, or Firm* — Shumaker & Sieffert, P.A.

(57) ABSTRACT

Techniques are disclosed for maintaining processing unit core affinity for fragmented packets. In one example, a service physical interface card (PIC) implementing a service plane of a network device receives fragmented and/or non-fragmented packet data for a traffic flow. The service PIC comprises at least one processing unit comprising multiple cores. A routing engine operating in a control plane of the network device defines one or more core groups comprising a subset of the cores. The routing engine assigns the traffic flow to a core group and a forwarding engine operating in a forwarding plane of the network device forwards the packet data for the traffic flow to the assigned core group. A core of the assigned core group applies a network service to the fragmented and/or non-fragmented packet data for the traffic flow, and the forwarding engine forwards the packet data for the traffic flow toward a destination.

18 Claims, 13 Drawing Sheets

MAINTAINING PROCESSING CORE AFFINITY FOR FRAGMENTED PACKETS IN NETWORK DEVICES

TECHNICAL FIELD

This disclosure generally relates to computer networks.

BACKGROUND

A computer network is a collection of interconnected computing devices that exchange data and share resources. In a packet-based network, such as the Internet, the computing devices communicate data by dividing the data into small blocks called packets. The packets are individually routed across the network from a source device to a destination device. The destination device extracts the data from the packets and assembles the data into its original form. Dividing the data into packets enables the source device to resend only those individual packets that may be lost during transmission.

SUMMARY

In general, the disclosure describes techniques for maintaining processing core affinity for fragmented packets across service planes and/or forwarding planes of network devices. In one example, a service plane of a network device includes at least one service physical interface card (PIC) that receives packet data, such as fragmented or non-fragmented packet data, for a traffic flow (also referred to herein as a "packet flow" or "flow"). The service PIC comprises at least one processing unit, e.g., a central processing unit (CPU), that comprises multiple cores. A routing engine operating in a control plane of the network device defines one or more core groups for the service PIC, each of the core groups comprising one or more of the cores. The routing engine assigns the packet data for the traffic flow to a core group of the one or more core groups. The assigned core group in the service PIC applies a network service to the packet data for the traffic flow. After applying the network service to the packet data, a forwarding engine operating in a forwarding plane of the network device forwards the packet data for the traffic flow toward a destination.

The techniques of the disclosure may provide specific improvements to the computer-related field of computer networking that have practical applications. For example, the techniques disclosed herein enable the uniform distribution of network traffic across cores within one or more multi-core processing units of one or more service PICs. The techniques of the disclosure may improve the load balancing of network traffic across processing cores within a particular service PIC while maintaining packet flow affinity. Furthermore, the techniques of the disclosure may reduce redirection of packet flows from one core of the service PIC to other cores of the service PIC, thereby reducing latency of packet flows within the service PIC. Accordingly, the techniques set forth herein may enable a service PIC to exhibit increased throughput and efficiency when processing packet flows of network traffic.

In one example, this disclosure describes a method comprising: defining, by a routing engine operating in a control plane of a network device and executing on processing circuitry of the network device, one or more core groups, wherein the network device comprises at least one service physical interface card (PIC) implementing a service plane for the network device, wherein the service PIC of the network device comprises at least one processing unit, wherein the at least one processing unit comprises a plurality of cores, wherein each core group comprises a subset of the plurality of cores of the at least one processing unit of the service PIC, and wherein the subset of the plurality of cores of the core group comprises at least a first core and a second core; assigning, by the routing engine, a traffic flow to a core group of the one or more core groups; receiving, by the core group of the service PIC to which the traffic flow is assigned, fragmented packet data for the traffic flow; assembling, by the first core of the core group to which the traffic flow is assigned, the fragmented packet data for the traffic flow into packets for the traffic flow; and applying, by the second core of the core group to which the traffic flow is assigned, a network service to the packets for the traffic flow.

In another example, this disclosure describes a network device comprising: processing circuitry configured to execute a routing engine operating in a control plane; and at least one service physical interface card (PIC) implementing a service plane for the network device, wherein the service PIC comprises at least one processing unit and wherein the at least one processing unit comprises a plurality of cores, wherein the routing engine is configured to define one or more core groups, wherein each core group comprises a subset of the plurality of cores of the at least one processing unit of the service PIC, and wherein the subset of the plurality of cores of the core group comprises at least a first core and a second core, wherein the routing engine is further configured to assign a traffic flow to a core group of the one or more core groups, wherein the core group of the service PIC to which the traffic flow is assigned is configured to receive fragmented packet data for the traffic flow, wherein the first core of the core group to which the traffic flow is assigned is configured to assemble the fragmented packet data for the traffic flow into packets for the traffic flow, and wherein the second core of the core group to which the traffic flow is assigned is configured to apply a network service to the packets for the traffic flow.

In another example, this disclosure describes a non-transitory, computer-readable medium comprising instructions, that, when executed, are configured to cause: processing circuitry of a network device to execute a routing engine operating in a control plane of the network device to define one or more core groups, wherein the network device comprises at least one service physical interface card (PIC) implementing a service plane for the network device, wherein the service PIC comprises at least one processing unit, wherein the at least one processing unit comprises a plurality of cores, and wherein each core group comprises a subset of the plurality of cores of the at least one processing unit of the service PIC, and wherein the subset of the plurality of cores of the core group comprises at least a first core and a second core, wherein the routing engine is further configured to assign a traffic flow to a core group of the one or more core groups, wherein the core group of the service PIC to which the traffic flow is assigned is configured to receive fragmented packet data for the traffic flow, wherein the first core of the core group to which the traffic flow is assigned is configured to assemble the fragmented packet data for the traffic flow into packets for the traffic flow, and wherein the second core of the core group to which the traffic flow is assigned is configured to apply a network service to the packets for the traffic flow.

In another example, this disclosure describes a method comprising: defining, by a routing engine operating in a control plane of a network device and executing on processing circuitry of the network device, one or more core groups, wherein the network device comprises at least one service physical interface card (PIC) implementing a service plane for the network device, wherein the service PIC of the network device comprises at least one processing unit, wherein the at least one processing unit comprises a plurality of cores, wherein each core group comprises a subset of the plurality of cores of the at least one processing unit of the service PIC, and wherein the subset of the plurality of cores of the core group comprises at least a first core; receiving, by a forwarding engine operating in a forwarding plane of the network device and executing on the processing circuitry, fragmented packet data for a traffic flow; assembling, by the forwarding engine, the fragmented packet data for the traffic flow into packets for the traffic flow; assigning, by the routing engine, the traffic flow to a core group of the one or more core groups; receiving, by the core group to which the traffic flow is assigned, the packets for the traffic flow; and applying, by the first core of the core group to which the traffic flow is assigned, a network service to the packets for the traffic flow.

In another example, this disclosure describes a network device comprising: processing circuitry configured to execute a routing engine operating in a control plane and a forwarding engine operating in a forwarding plane; and at least one service physical interface card (PIC) implementing a service plane for the network device, wherein the service PIC of the network device comprises at least one processing unit, and wherein the at least one processing unit comprises a plurality of cores, wherein the routing engine is configured to define one or more core groups, wherein each core group comprises a subset of the plurality of cores of the at least one processing unit of the service PIC, and wherein the subset of the plurality of cores of the core group comprises at least a first core, wherein the forwarding engine is configured to receive fragmented packet data for a traffic flow; wherein the forwarding engine is further configured to assemble the fragmented packet data for the traffic flow into packets for the traffic flow, wherein the routing engine is configured to assign the traffic flow to a core group of the one or more core groups, wherein the core group to which the traffic flow is assigned is configured to receive the packets for the traffic flow, and wherein the first core of the core group to which the traffic flow is assigned is configured to apply a network service to the packets for the traffic flow.

In another example, this disclosure describes a non-transitory, computer-readable medium comprising instructions, that, when executed, are configured to cause: processing circuitry of a network device to execute a routing engine operating in a control plane of the network device to define one or more core groups, wherein the network device comprises at least one service physical interface card (PIC) implementing a service plane for the network device, wherein the service PIC of the network device comprises at least one processing unit, wherein the at least one processing unit comprises a plurality of cores, wherein each core group comprises a subset of the plurality of cores of the at least one processing unit of the service PIC, and wherein the subset of the plurality of cores of the core group comprises at least a first core, wherein the processing circuitry is further configured to execute a forwarding engine operating in a forwarding plane of the network device configured to receive fragmented packet data for a traffic flow, wherein the forwarding engine is further configured to assemble the fragmented packet data for the traffic flow into packets for the traffic flow, wherein the routing engine is configured to assign the traffic flow to a core group of the one or more core groups, wherein the core group of the service PIC to which the traffic flow is assigned is configured to receive the packets for the traffic flow, and wherein the first core of the core group to which the traffic flow is assigned is configured to apply a network service to the packets for the traffic flow.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters refer to like elements throughout the figures and description.

DETAILED DESCRIPTION

Figure 1:
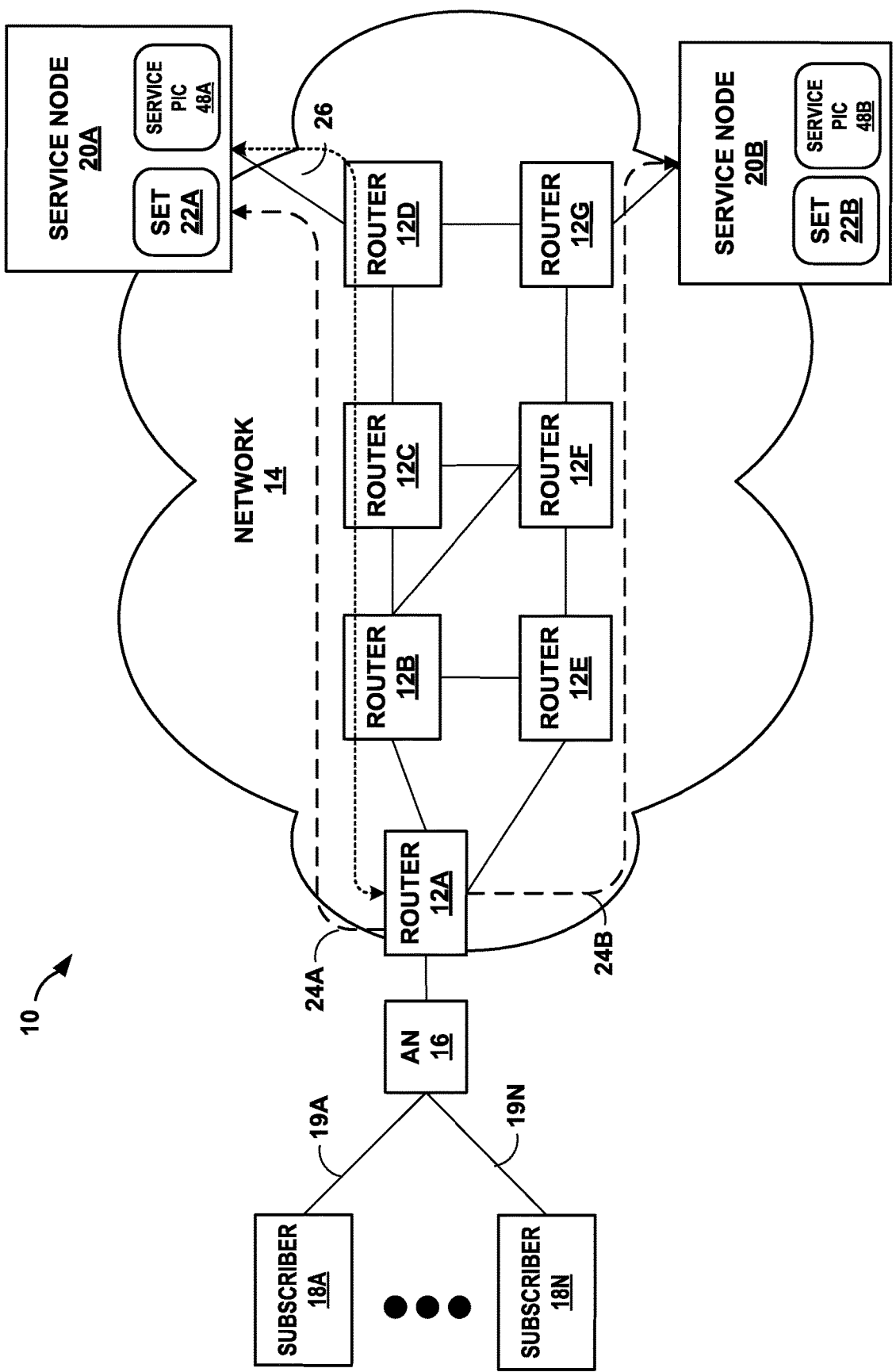
FIG. 1 is a block diagram illustrating an example system in which routers and service nodes are configured to operate in accordance with the techniques of this disclosure.

A network device may implement three different types of planes: the control plane, the forwarding plane, and the service plane. The control plane of a network device executes protocol daemons and programs a forwarding table based on a routing table. The data plane uses the forwarding table created by the control plane to forward received packets to a destination. The data plane may also be referred to as a forwarding plane and may comprise one or more packet forwarding engines (PFEs). When the network device receives traffic to which a network service (e.g., a stateful service such as a stateful firewall service or any service non-native to the data plane) is to be applied, the data plane forwards the traffic to the service plane, which applies the network service to the traffic and sends the traffic back to the data plane for forwarding to an intended destination. In some examples, a network device comprises at least one service PIC that implements the service plane for the network device. The service PIC typically includes one or more processing units that comprise multiple cores that apply network services to the packets of the packet flow.

Internet Protocol Security (IPsec) is a secure network protocol suite that authenticates and encrypts the packets of data to provide secure encrypted communication between two computers over an Internet Protocol (IP) network. It is used in virtual private networks (VPNs). IPsec includes protocols for establishing mutual authentication between agents at the beginning of a session and negotiation of cryptographic keys to use during the session. IPsec can protect data flows between a pair of hosts (host-to-host), between a pair of security gateways (network-to-network), or between a security gateway and a host (network-to-host). IPsec uses cryptographic security services to protect communications over IP networks. It supports network-level peer authentication, data-origin authentication, data integrity, data confidentiality (encryption), and replay protection. As an enhancement to Internet Protocol version 4 (IPv4), IPsec is an OSI model Layer-3 (L3) or Internet layer end-to-end security scheme, and therefore can secure applications at the IP layer.

For application of network services to a packet flow by the service plane of a network device, the network device creates an entry for the packet flow in a flow state table and maintains a flow state in the service plane. The network device also maintains packet flow information within a same core of the processing unit for bidirectional traffic. It may be challenging to implement parallel processing and load distribution across a multi-core and/or multi-processing unit field-replaceable unit (FRU) environment for fragmented packet processing because of the above requirements to maintain flow state and flow information within the same core. For example, conventional network devices may be unable to distribute packets across different processing units or different cores within at least one processing unit while maintaining consistent flow state and flow information across the different cores of at least one processing unit that process different packets of the same packet flow. This may prevent effective load distribution of packet flows across the cores of a service PIC after the service PIC receives multiple packet fragments of a packet flow.

As described herein, a "non-initial packet fragment" or "non-initial fragment" is a packet fragment that does not contain selector values that may be needed for access control. For example, a non-initial fragment may not include, for example, information such as one or more of Next Layer Protocol, a source port, a destination port, ICMP message type or code, or Mobility Header type, etc. As described herein, an "initial packet fragment" or "initial fragment" is a packet fragment that contains the selector values needed for access control. For Internet Protocol Version 6 (IPv6), the packet fragment that contains the Next Layer Protocol and ports (or ICMP message type/code or Mobility Header type) may depend on the kind and number of extension headers present. The initial fragment may not necessarily be the sequentially first fragment in a traffic flow. Additional example information with respect to initial fragments and non-initial fragments is described in "Security Architecture for the Internet Protocol," RFC4301, Internet Engineering Task Force (IETF), December 2005, available at https://tools.ietf.org/html/rfc4301, the entire contents of which is incorporated herein by reference.

A 3-tuple hash may be insufficient to enable a conventional forwarding plane to perform load balancing and flow distribution across multiple cores of a service PIC. For example, in some situations, thousands of different flows may have the same 3-tuple (e.g., source address, destination address, and next protocol) because the flows may differ only by the source and destination ports (or SPU for IPsec traffic). Therefore, it is possible that a few cores, to which the 3-tuple is assigned, may be overloaded attempting to process the thousands of different flows that have that same 3-tuple. In contrast, other cores, to which the 3-tuple is not assigned, may be starving of flows and traffic load. Therefore, a 5-tuple or a 7-tuple is more effective for efficiently performing flow hosting, distribution, and load balancing across cores.

It may be difficult for a service PIC to perform effective load balancing of traffic flows comprising fragmented packet data. Non-fragmented packets and an initial fragment may contain 5-tuple or 7-tuple data, which a forwarding plane may use to perform load balancing of traffic flows across multiple cores of the service PIC. However, a non-initial fragment may contain only L3 data. L3 data refers to information pertaining to the OSI Model Layer-3 (e.g., the Network Layer) and comprises, e.g., Internet Protocol version 4 (IPv4) or Internet Protocol version 6 (IPv6) information. Such L3 data may be insufficient to perform load balancing of a traffic flow with which the non-initial fragment is associated. For example, if a fragmented packet flow is load-balanced across a first and second processing core of a service PIC, the first core may receive an initial packet fragment, and the second core may receive an non-initial packet fragment (e.g., an intermediate or last packet fragment). The first core may obtain the 5-tuple or 7-tuple data from the initial fragment, but the second core may have only the L3 information obtained from the received non-initial packet fragment. Therefore, the second core may not be able to reassemble packets from the non-initial packet fragment or apply network services to the non-initial packet fragment from the L3 data of the non-initial fragment alone, thereby limiting load balancing of fragmented packet flows across multiple cores of a service PIC.

Additionally, a service PIC may suffer a cross pollination problem. For example, for a same packet flow, all non-fragments arrive in a first core, which creates a first instance of the packet flow, and all packet fragments arrive in a second core, which creates a second instance of the packet flow. This may necessitate a service PIC to fully reassemble packet fragments to obtain 5-tuple and/or 7-tuple information for each instance of the packet flow, which may drastically reduce system performance and necessitate the re-fragmentation of the packets prior to transmission to the forwarding plane after applying a service to the fully reassembled packets.

The techniques of the disclosure enable a control plane and a forwarding plane of a network device to perform load distribution of fragmented packet flows across multiple cores of a service PIC while still maintaining core affinity for each packet flow by enabling the forwarding plane to perform load balancing of the packet flows before the service PIC receives the packet fragments. For example, as described herein, the control plane uses 5-tuple or 7-tuple information from non-fragment packets to distribute flows symmetrically across multiple cores of at least one processing unit of at least one service PIC. In this fashion, the techniques of the disclosure enable the forwarding plane to perform effective load balancing across of fragmented packet flows across multiple cores of a service PIC while maintaining core affinity for each packet flow, thereby increasing the performance of service PICs and allowing for scalable deployment across large networks.

FIG. 1 is a block diagram illustrating an example system 10 in which routers 12A-12G ("routers 12") and service nodes 20A-20B ("service nodes 20") of network 14 are configured to operate in accordance with the techniques of this disclosure. In the illustrated example of FIG. 1, router 12A is an edge router of a network 14, which may be administered by a network service provider, and provides connectivity for subscribers 18A-18N ("subscribers 18"). Edge router 12A is coupled to access node (AN) 16 ("AN 16") via access links 19A-19N. Subscribers may be associated with customer networks or access networks (not shown). Edge router 12A communicates with access node 16 to provide subscribers 18 with access to network 14.

Each of subscribers 18 may include one or more computing devices (not shown), such as personal computers, laptop computers, handheld computers, workstations, servers, switches, printers, or other devices. Network 14 may be a service provider network coupled to one or more networks administered by other service providers, and may thus form part of a large-scale public network infrastructure, e.g., the Internet. The service provider may provide subscribers 18 with access to the Internet via network 14, which allows computing devices represented by subscribers 18 to communicate with computing devices within the Internet or with another one of subscribers 18. FIG. 1 may be a simplified view of network 14. Network 14 may include a variety of other network devices (not shown), such as routers, switches, servers, and the like and may be connected to other networks.

In this example, routers 12A-12G are connected to one another by physical links. The physical links 15 may be a physical medium, such as a copper wire, a coaxial cable, any of a host of different fiber optic lines, or a wireless connection. In order to maintain an accurate representation of the network 14, routers 12 and service nodes 20 exchange routing information using control-plane signaling in accordance with one or more defined protocols, such as the Border Gateway Protocol (BGP). Another example protocol for exchanging routing information is the Intermediate System to Intermediate System protocol (ISIS), which is an interior gateway routing protocol for IP networks for communicating link-state information within an autonomous system. Other examples of interior routing protocols include the Open Shortest Path First (OSPF), and the Routing Information Protocol (RIP).

The example of FIG. 1 illustrates a service enabling technology function ("SET 22A") hosted by service node 20A that is accessed by subscribers 18A-18N across service engineered path 24A that extends between edge router 12A and service node 20A. As used herein, a "service enabling technology (SET)" function is a service enabling technology that is physically deployed and hosted at a service node. Examples of service enabling technology functions may include applications, session border controller (SBC), virtual appliance, virtual cache, network traffic acceleration, network address translation (NAT), firewall, deep packet inspection (DPI), Quality of Service (QoS), access control, and other functions. In some examples, services provided by SETs may be composite services composed of two or more services, and may form a single externally visible service to subscribers 18. As one example, a SET may be a composite SET consisting of NAT services and firewall services.

Each service node 20 is an example of a network device, such as a router, switch, etc. Each of service nodes 20 comprise one or more services PICs 48A and 48B (collectively, "service PICs 48"). Each of service PICs 48 implements a service plane for a respective service node 20 for application of one or more network services (e.g., such as SETs 22) to received traffic. Each of service PICs 48 comprises at least one processing unit that comprise a plurality of cores.

As one example, edge router 12A receives a request for a particular service from a subscriber. For example, edge router 12A may receive a request from subscriber 18A for a parental control application service enabling technology function. Edge router 12A selects service node 20A as being able to provide the requested parental control application service enabling technology function. Service node 20A hosts an instance 22A of the parental control application service enabling technology function. In response to the request, edge router 12A establishes a service engineered path 24A to service node 20A, if service engineered path 24A is not already in place. Service engineered path 24A may be a traffic-engineered network tunnel, such as a label switched path (LSP) established using a resource reservation protocol, such as Resource Reservation Protocol with Traffic-Engineering Extensions (RSVP-TE), or other type of tunnel. In some examples, multiple SETs may be linked together using service engineered paths 24. As one example, router 12A may be establishing the service engineered paths 24 to carry OSI Model Layer-2 (L2) communications from subscribers 18 to service nodes 20 in the form of MPLS packets that enter the respective service engineered path 24 at ingress router 12A and exit the service engineered path 24 at service node 20A or 20B.

In addition, edge router 12A may also establish backup service engineered path 24B to a second service node 22B, which is a second service node that edge router 12A selects as also being able to provide the requested parental control application service enabling technology function. Service engineered path 24B is a second service engineered path, i.e., another traffic-engineered network tunnel. SET 22B may be a second instance of the same SET as SET 22A. Edge router 12A may use fast reroute extensions to RSVP-TE.

Upon receiving network traffic from subscriber 18A, edge router 12A determines that a profile of subscriber 18A requires the traffic to be sent on service engineered path 24A to service node 20A for application of the parental control application 22A. Edge router 12A then forwards the traffic from subscriber 18A on service engineered path 24A, such as by appending an MPLS label to the traffic from subscriber 18A.

In accordance with the techniques of the disclosure, service node 20A, upon receiving traffic from subscriber 18A may perform load balancing of packet flows across multiple cores of service PIC 48A while maintaining core affinity for fragmented packets. Maintaining core affinity, as described herein, refers to assigning a traffic flow to a particular core such that the traffic flow is processed by only the assigned core (and not an unassigned core). As described herein, service PIC 48A implements a service plane for service node 20A. As described in more detail below with respect to FIG. 2, service PIC 48A receives packet fragments for a traffic flow from edge router 12A. A routing engine (not depicted in FIG. 1) operating in a control plane of service node 20A defines one or more core groups comprising one or more of the cores of service PIC 48A. The routing engine of service node 20A assigns packet fragments for the traffic flow to a core group of the one or more core groups of service PIC 48A. The assigned core group applies a network service to the packet fragments for the traffic flow. After applying the network service to the packet fragments, a forwarding engine (not depicted in FIG. 1) operating in a forwarding plane of service node 20A forwards the packet fragments for the traffic flow toward a destination of the traffic flow.

The configuration of the network environment illustrated in FIG. 1 is merely exemplary. For example, network 14 may include any number of edge routers coupled to one or more customer networks. Nonetheless, for ease of description, only edge router 12A and access node 16 are illustrated in FIG. 1. As another example, network 14 may include a greater number of service nodes 20 than shown, and each of service nodes 20 may provide a plurality of network services and SETs.

Figure 2:
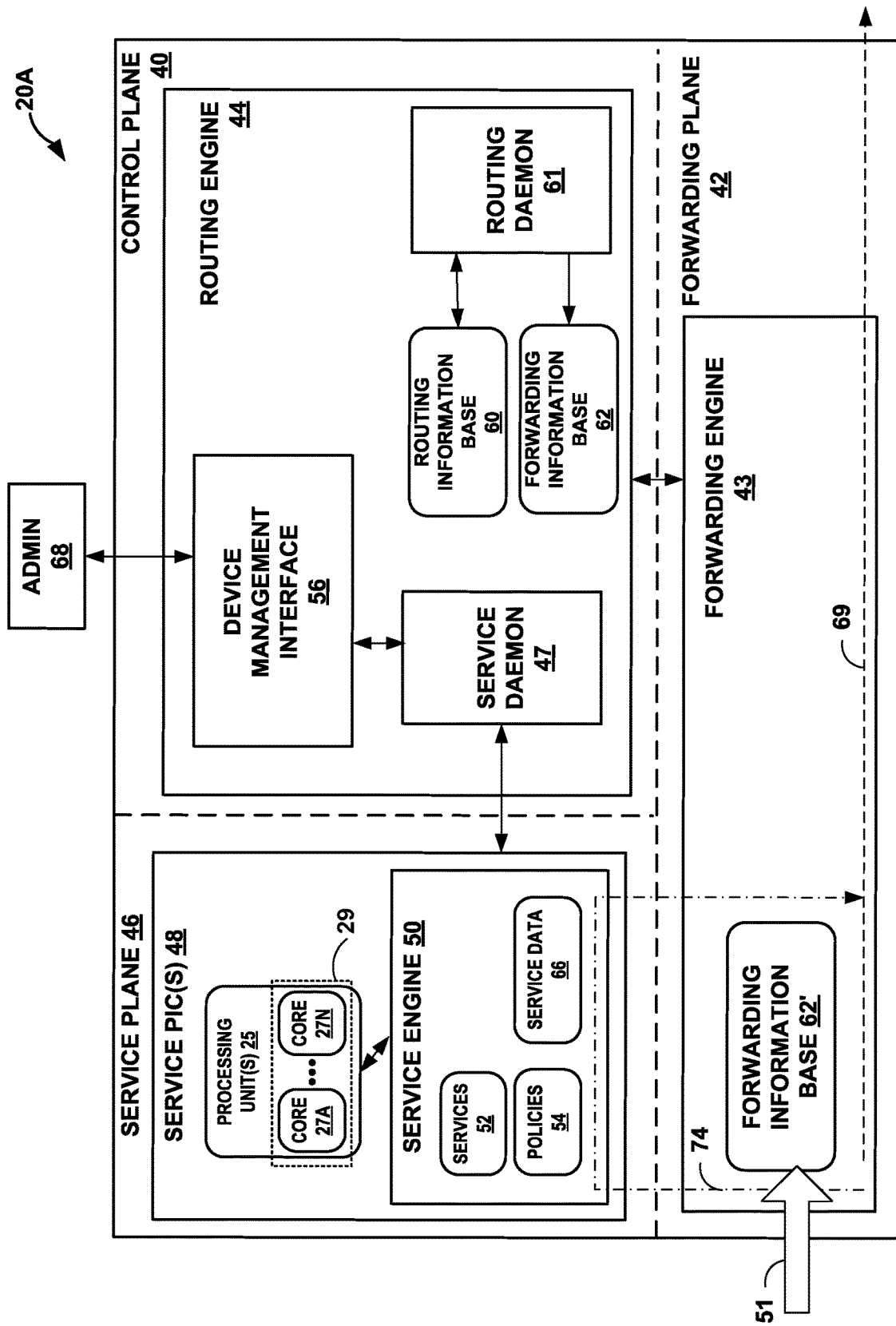
FIG. 2 is a block diagram illustrating an example embodiment of a service node network device in accordance with the techniques of this disclosure.

FIG. 2 is a block diagram illustrating an example of service node 20A in greater detail. In some examples, service node 20A is an example of a network device, such as a router or switch. Service node 20A includes forwarding plane 42, control plane 40 (also referred to herein as "routing plane 40") and service plane 46. Service node 20A may provide forwarding plane 42 for forwarding network traffic 51 and control plane 40 for routing network traffic 51. In some instances, forwarding plane 42 may be distributed over a plurality of interfaces or interface cards (not shown), e.g., in a multi-chassis router. In other instances, forwarding plane 42 may be located in a central location, such as a programmable processor or other control unit of service node 20A. Typically, control plane 40 resides in this central location, and in instances where forwarding plane 42 resides in the central location, the same programmable processor or other control unit may include or execute both forwarding plane 42 and control plane 40. Control plane 40 may, in some embodiments, be distributed over a plurality of processors or components.

Control plane 40 may include a routing engine 44 that resolves routes through network 14 in accordance with one or more of a plurality of routing protocols. Routing engine 44 may include a device management interface 56 ("DMI 56") and a routing daemon 61. Routing engine 44 is primarily responsible for maintaining routing information base (RIB) 60 to reflect a current topology of network 14. RIB 60 describes the topology of a network and, in particular, routes through the network. RIB 60 may include, for example, route data that describes various routes within the network, and corresponding next hop data indicating appropriate neighboring devices within the network for each of the routes.

In addition, routing engine 44 uses routes stored in RIB 60 to compute best paths for particular network destinations and derive forwarding information base 62 (FIB 62), which includes entries that map destination addresses to outbound interfaces on service node 20A. Routing engine 44 may push a subset of FIB 62 to forwarding engine 43 for storage as FIB 62'. FIB 62 may, therefore, be thought of as a subset of the information contained within RIB 60. FIB 62 may also include labels for use in forwarding MPLS packets along LSPs. Routing daemon 61 may represent a software module that updates RIB 60 to reflect a current topology of network 14. While described as a daemon or software module executed by routing engine 44, routing daemon 61 may be implemented as a hardware module or a combination of both hardware and software. Routing engine 44 also includes a service daemon 47 that interfaces with service plane 46, such as to permit configuration of service PIC 48 by device management interface 56.

Forwarding plane 42 may include a forwarding engine 43. Forwarding engine 43 may represent a software and/or hardware component, such as one or more interface cards (not shown), that forwards network traffic 51. In some examples, forwarding plane may include a plurality of PFEs, wherein each PFE implements a separate instance of forwarding engine 43. Forwarding engine 43 may divert aspects of network traffic 51 as service traffic 74 to service engine 50 within service plane 46. After application of one or more services 52, service engine 50 returns the service traffic 74 to forwarding engine 43 to be merged into outbound network traffic 69. Forwarding engine 43 may forward some aspects of network traffic 51 as outbound network traffic 69 without diverting to the service plane 46, when application of services is not needed for the traffic.

Forwarding engine 43 may represent a central or distributed forwarding engine, where a distributed forwarding engine is distributed across a plurality of interface cards and a central forwarding engine resides in the above described central location, e.g., control plane 40, of service node 20A. Forwarding engine 43 may forward network traffic 51 in accordance with forwarding information base 62' (FIB 62'). FIB 62' may comprise an association or table of mappings identifying an interface by which to forward a particular packet or data unit of network traffic 51.

Service node 20A may further provide service plane 46 for applying one or more of a plurality of services 52 to network traffic 51. Service plane 46 may implement the functionality of a network security device and/or other service oriented devices using at least one service PIC 48. As further examples, service plane 46 may implement service enabling technologies (SETs), including services and service oriented devices, represented by services 52. Example SETs that may be provided by services 52 include, for example, applications, session border controller (SBC), virtual appliance, virtual cache, network traffic acceleration, network address translation (NAT), firewall, deep packet inspection (DPI), Quality of Service (QoS), access control, or other service functions.

Service plane 46 of service node 48 is implemented by service PIC 48. In some examples, service PIC 48 comprises at least one processing unit 25. Processing unit 25 is, for example, at least one multicore processor that comprises a plurality of cores 27. Each core 27 may comprise one or more physical microprocessors, digital signal processors (DSPs), application specific integrated circuits (ASICs), field programmable gate arrays (FPGAs), or any other equivalent integrated or discrete logic circuitry, as well as any combinations of such components. In some examples, service node 48 comprises a plurality of service PICs 48. In some examples, service PIC 48 comprises a plurality of processing units 25, each processing unit 25 comprising a plurality of cores 27A-27N (collectively, "cores 27").

Processing unit(s) 25 and cores 27 of service PIC 48 execute service engine 50. Service engine 50 may represent a software and/or hardware component that applies network services 52 in accordance with policy rules defined by policy configuration data stored by policies 54. Policies 54 may be a policy module that stores and maintains policy configuration data for service engine 50 and, by extension, service plane 46. In some examples, policies 54 may maintain policy configuration data in an XML-based encoding. However, in some embodiments, policies 54 may maintain policy configuration data in the form of one or more tables, linked lists, databases, flat files, or any other data structure.

Device management interface (DMI) 56 may represent a software and/or hardware module that presents an interface with which an administrator or an administrative device, represented by "ADMIN" 68, may interact to specify certain operational characteristics of service node 20A. In response to invocation by admin 68, device management interface 56 interacts with other components of service node 20A, such as to retrieve, configure, copy, and/or delete policy configuration data stored in policies 54, update service data 66 via service daemon 47, and to perform other management-related functions.

Service engine 50 applies one or more of services 52 to received packets in accordance with policies 54. As one example, for a service 52 comprising a parental control application, a packet may be received from a subscriber requesting access to web content associated with a given uniform resource locator (URL). The service 52 causes service engine 50 to reference policies 54 to determine whether a profile of a subscriber from which the packet is received allows the request from the subscriber to be allowed through to the specified URL. In another example, service engine 50 may apply a QoS policy that classifies packets meeting the policy condition to a particular forwarding equivalence class (FEC). In these instances, service engine 50 may forward packets differently depending on their classified FEC to meet QoS requirements.

Policy configuration data stored by policies 54 may include policies for any of services 52 applied by service plane 46. Although described herein with respect to policies 54 stored within service plane 46, in some embodiments, policies may be stored within or distributed to additional service PICs 48, control plane 40 or forwarding plane 42. For example, in some embodiments, forwarding plane 42 may store one or more policy rules for prompt application by the forwarding elements to network traffic 51.

As described herein, one or more of cores 27 may be categorized as a "3-tuple" core that processes packet fragments using 3-tuple data, such as by using a 3-tuple hash for a traffic flow corresponding to the packet fragments. As further described herein, one or more of cores 27 may be categorized as a "5-tuple" core that processes packet fragments using 5-tuple data, such as by using 5-tuple hash data for a traffic flow corresponding to the packet fragments. A "3-tuple" comprises a source address, a destination address, and a protocol for a traffic flow. A "5-tuple" refers to a source address, a source port, a destination address, a destination port, and a protocol for a traffic flow. Where IPSec is used, the 5-tuple may specify a Security Parameter Index (SPI) instead of a source port and destination port. Further, where IPSec is used, the protocol specifies a next protocol, such as Encapsulating Security Payload (ESP) or Authentication Header (AH).

A "7-tuple" refers to a source address, a source port, a destination address, a destination port, a protocol, a service type, and a logical interface for a traffic flow. In some examples, the logical interface of the 7-tuple is a VLAN identifier. Where IPSec is used, the 7-tuple may specify an SPI instead of a source port and destination port. Further, where IPSec is used, the protocol specifies a next protocol, such as ESP or AH.

Conventionally, a service PIC steers packet fragments by using 5-tuple and 3-tuple hashes or configurable hash parameters to load balance traffic flows across a set of cores of at least one processing unit. In some examples, a conventional service PIC additionally may use a firewall and filter for steering traffic across servers. However, this may create a choke point where multiple cores of the service PIC attempt to access common packet buffers and hash tables during reassembly of packet fragments of all flows. Furthermore, the forwarding plane and the service PIC share software hash logic amongst one another. Because, in conventional operation, a service PIC selects a 5-tuple core for processing a packet fragment only after a core of the service PIC receives the packet fragment, the service PIC may select only a single 5-tuple core of a single processing unit to handle a traffic flow. This prevents the forwarding plane from implementing effective load balancing across multiple cores (e.g., multiple 5-tuple cores) of the service PIC. Furthermore, where the service PIC redirects assembled packet data from a 3-tuple core to a 5-tuple core, performance is further reduced. Generally speaking, reassembly of packet fragments by conventional service PICs reduces the overall performance of the service PIC.

In accordance with the techniques of the disclosure, service node 20A maintains an affinity of cores 27 of processing unit(s) 25 for fragmented packets across forwarding plane 42 and service plane 46. As described herein, service PIC 48 uses a control plane-assisted flow affinity model for packet fragments. For example, control plane 40 defines a plurality of core groups 29. Each core group 29 comprises one or more cores 27 of at least one processing unit 25 of, for example, service PIC 48. Each core group 29 includes a packet buffer and hash table that is unique to the core group. As an example, control plane 40 assigns a traffic flow to a particular core group 29. Forwarding engine 43 sends packet fragments of the traffic flow to a 3-tuple core included in the assigned core group 29, while sending non-fragments of the same traffic flow to a 5-tuple core included in the assigned core group 29 along with corresponding metadata. In this example, core group 29 of service PIC 48 performs partial reassembly of packet fragments after receiving the fragments and/or packets.

This solution may allow control plane 40 to load balance traffic flows across cores 27 and processing unit(s) 25 of service PIC 48, while maintaining core affinity for each traffic flow, as well as solving the cross pollination problem so as to prevent multiple instances of the same flow being created in the same hash table where fragmented and non-fragmented packets are received in different cores 27. Furthermore, because control plane 40 preselects the service PIC 48, at least one processing unit(s) 25, and core group 29 of cores 27, routing engine 44 may steer all the fragments of the flow into a single 3-tuple core of the core group of cores 27, thereby avoiding the overuse of shared resources, such as the hash table and common buffers, and thereby improving performance of fragment reassembly in the service PIC(s) 48.

The techniques of the disclosure enable two different implementations for reassembly of packet fragments. In the first implementation, packet fragment reassembly occurs in service plane 46. In this implementation, routing engine 44 of control plane 40 defines core group 29 that includes at least one 3-tuple core 27 and at least one 5-tuple core 27 within processing unit 25, for example. Routing engine 44 assigns a traffic flow to core group 29. Core group 29 receives fragmented packet data for the traffic flow. The 3-tuple core 27 of core group 29 assembles the fragmented packet data for the traffic flow into packets for the traffic flow and forwards the packets to the 5-tuple core 27. The 5-tuple core 27 applies a network service to the packets for the traffic flow and outputs the packets for the traffic flow to forwarding engine 43. Forwarding engine 43 forwards the packets for the traffic flow toward a destination of the traffic flow.

In the second implementation, packet fragment reassembly occurs in forwarding plane 42. In this implementation, routing engine 44 of control plane 40 defines core group 29 that includes at least one 5-tuple core 27 and does not include any 3-tuple cores. Routing engine 44 assigns a traffic flow to core group 29. Forwarding engine 43 receives fragmented packet data for the traffic flow. Forwarding engine 43 of forwarding plane 42 generates metadata for fragmented packets and forwards the fragmented packets with the metadata to an internal WAN loopback channel of the same forwarding plane 42 to generate a new, non-fragmented packet (as described in more detail below).

As described herein, the use of an internal WAN loopback channel refers to connecting two WAN ports of forwarding plane 42 via an internal connection, such as a PCI or other high-speed means. After adding metadata to a packet fragment, forwarding engine 43 outputs the metadata and packet fragment to a first internal port of forwarding plane 42 (e.g., a WAN-out port) and receives the same metadata and packet fragment via a second internal port of forwarding plane 42 (e.g., a WAN-in port), where forwarding engine 43 treats the received metadata and packet fragment as a new packet. However, because the packet table entry is the same, forwarding engine 43 is not required to free and create a new entry because a new thread of the same forwarding block of forwarding engine 43 may use the same packet table pointer. This improves performance and reduce latency by not re-creating the packet into the forwarding plane's packet table entry. It is noted that the original thread should send all of the fragments in the same thread context. However, after the packet is transmitted to and received from the internal WAN loopback channel, each fragment can be processed by one unique thread, thereby enabling parallelizing of the packet processing.

Forwarding engine 43 of forwarding plane 42 sends non-fragmented packets, e.g., both original non-fragmented packets and generated non-fragmented packets, to 5-tuple core 27 of core group 29. 5-tuple core 27 core applies network services to the non-fragmented packets and outputs the packets for the traffic flow to forwarding engine 43. Forwarding engine 43 forwards the packets for the traffic flow toward a destination of the traffic flow. This solution removes the need for a 3-tuple core in the core group 29, thereby obviating the bottleneck in a conventional service PIC caused by transferring reassembled packets from a 3-tuple core to a 5-tuple core.

Aspects of service plane 46, control plane 40, or forwarding plane 42 may be implemented solely in software, or hardware, or may be implemented as a combination of software, hardware, or firmware. For example, service plane 46, control plane 40, or forwarding plane 42 may include one or more hardware-based processors which execute software instructions. In that case, the various software modules of service plane 46, control plane 40, or forwarding plane 42 may comprise executable instructions stored on a computer-readable storage medium, such as computer memory or hard disk.

Figure 3:
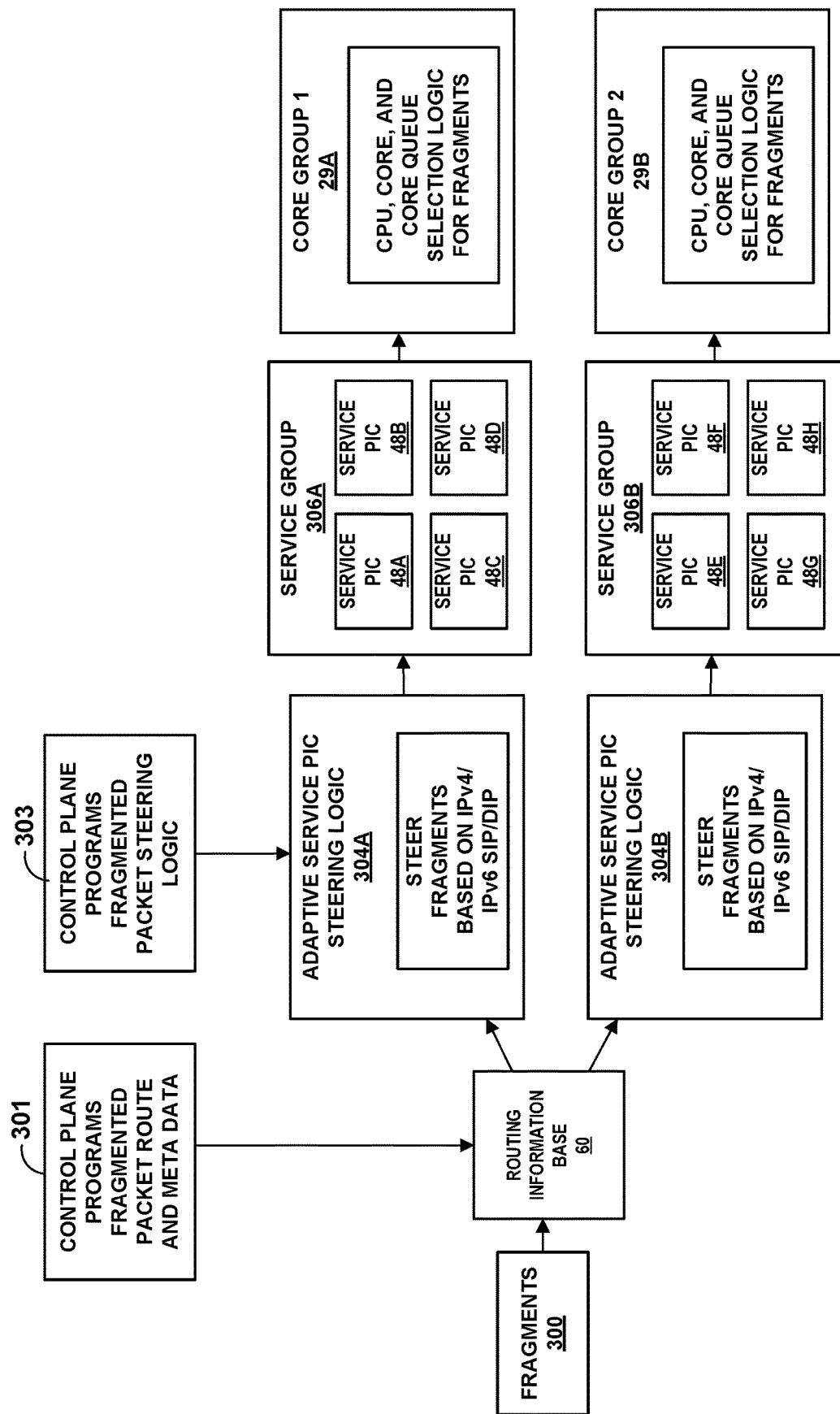
FIG. 3 is a hybrid flowchart and block diagram illustrating the use of core group affinity in a service physical interface card (PIC) in accordance with the techniques of the disclosure.

FIG. 3 is a hybrid flowchart and block diagram illustrating the use of core group affinity in a service PIC in accordance with the techniques of the disclosure. Specifically, FIG. 3 depicts an example of the model for the hierarchical assignment of service PICs 48A-48H (collectively, "service PICs 48"), processing units of service PICs 48, and core groups 29A-29B (collectively, "core groups 29") comprising one or more cores of the at least one processing units for processing packet data for a particular traffic flow. For convenience, FIG. 3 is described with respect to FIG. 2. As described herein, the term "service PIC" or "server" may be used interchangeably. The techniques of the disclosure identify and address core-level load balancing challenges for fragmented packets for the same traffic flow. The techniques disclosed herein are adaptive and may be applied to different services and applications that require maintaining state in terms of flow and core affinity for fragmented packets.

For a particular traffic flow, routing engine 44 of control plane 40 programs a route and metadata for fragmented packet data of the traffic flow (301). For example, routing engine 44 generates an entry for the traffic flow and stores the entry in RIB 60. Further, routing engine 44 of control plane 40 programs steering logic for fragmented packet data of the traffic flow (303). For example, routing engine 44 programs adaptive service PIC steering logic 304A-304B (collectively, "adaptive service PIC steering logic 304") to steer fragments 300 to a particular service group 306A-306B (collectively, "service group 306") and a particular service PIC 48 (e.g., such as one of service nodes 20 of FIG. 1) of the assigned service group 306 for processing. Furthermore, routing engine 44 steers fragments 300 to a particular core group of core groups 29, wherein the core group includes one or more selected cores of a selected service PIC 48. In some examples, routing engine 44 assigns a specific service PIC 48, processing unit(s), core group, and core(s) for hosting the flow based on the use of Internet Protocol version 4 (IPv4) or Internet Protocol version 6 (IPv6) by the traffic flow, a source IP address of the traffic flow, and/or a destination address of the traffic flow. Routing engine 44 assigns a core number of a service PIC to the traffic flow prior to forwarding engine 43 of forwarding plane 42 sending fragment 300 of the traffic flow to the assigned service PIC. Thus routing engine 44 and forwarding engine 43 may provide effective load balancing across a service PIC as well as across multiple cores of at least one processing unit of the service PIC. Furthermore, the techniques of the disclosure may solve the cross pollination problem of the creation of multiple instances of the same traffic flow in different cores by preventing the receipt of fragmented and non-fragmented packets for the same traffic flow in different cores. For example, because forwarding routing engine 44 pre-selects service PIC 48, and the core group 29, forwarding engine 43 may steer the fragments of a flow into a single 3-tuple core of core group 29 to maintain core affinity of the traffic flow. In this fashion, a service PIC as described herein may avoid the overuse of shared resources, such as the hash table and common buffers, thereby improving performance of fragment reassembly in service PIC 48.

Figure 4:
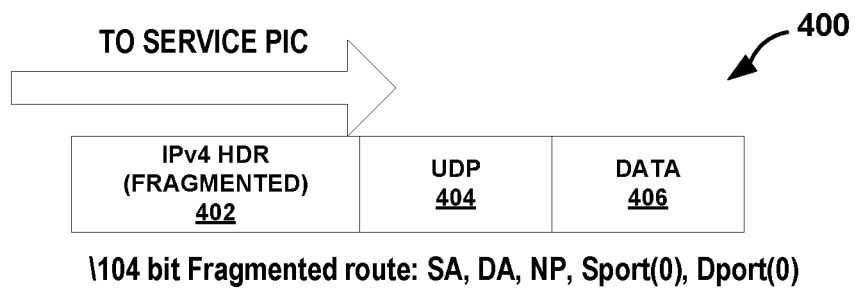
FIG. 4 is a block diagram illustrating an example control plane message for assigning an affinity of a core group in the service PIC of FIG. 2 to a traffic flow in accordance with the techniques of the disclosure.

FIG. 4 is a block diagram illustrating an example control plane message for assigning an affinity of a core group 29 in service PIC 48 of FIG. 2 to a traffic flow in accordance with the techniques of the disclosure. Routing engine 44 of control plane 40 typically applies steering logic to steer packets of a traffic flow to particular one of service PICs 48 using \104 or \72 bit routes. In accordance with the techniques of the disclosure, routing engine 44 of control plane 40 installs a \104 bit or \72 bit fragmented route for a traffic flow in RIB 60 via route ADD message 400. Route ADD message 400 includes an Internet Protocol version header 402 (e.g., an IPv4 header (HDR) in the example of FIG. 4), a communications protocol 404 (e.g., Uniform Data Protocol (UDP) in the example of FIG. 4), and one or more data fields 406. In some examples, route ADD message 400 specifies, via data field 406, a service PIC ID and/or a core group ID to which the corresponding traffic flow is assigned. In some examples, routing engine 44 zeros L4 information for the route. This \104 bit or \72 bit fragmented route is a different route than a \104 bit non-fragmented route. Routing engine 44 of control plane 40 sends the fragmented route ADD message to forwarding engine 43 of forwarding plane 42 for installation.

In some examples, service PIC 48 uses route ADD message 400 to identify a core group 29 comprising one or more cores 27 of service PIC 48 and assign such core group 29 to process packet data for a traffic flow corresponding to the route. Each core group 29 has a unique local hash table and a unique packet buffer for storing packet fragments. Thus, the selection of core groups 29 as described herein obviates the need for, e.g., a single hash table and packet buffer common to one processing unit 25, which may act as a choke point between cores 27 of the processing unit 25, thereby limiting the performance of service PIC 48.

Figure 5:
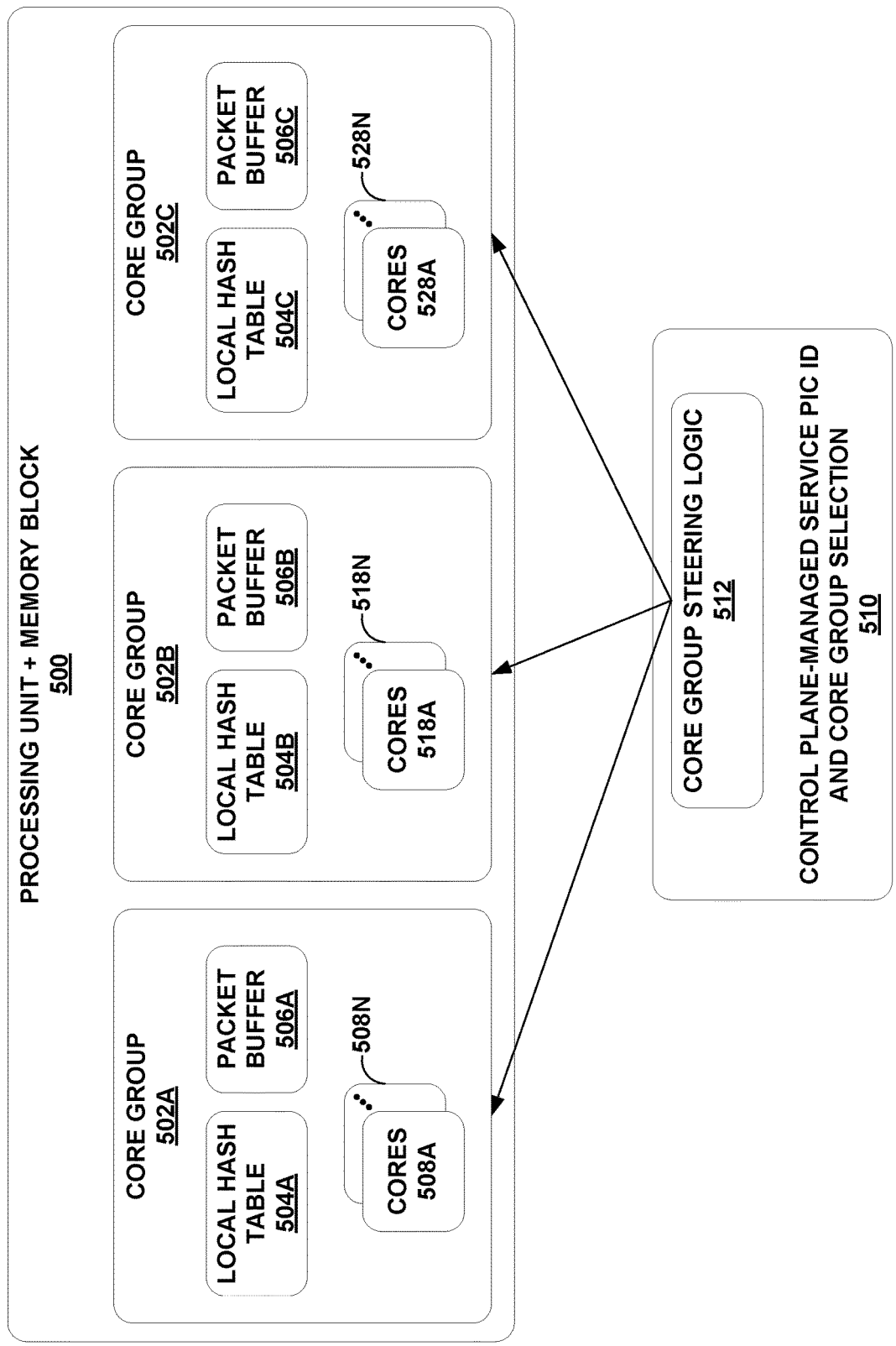
FIG. 5 is block diagram illustrating a core group steering model for a service PIC in accordance with the techniques of the disclosure.

FIG. 5 is block diagram illustrating a core group steering model for service PIC 48 of FIG. 2 in accordance with the techniques of the disclosure. Specifically, FIG. 5 depicts another example of the core group steering model which uses core group steering logic 512 to act as a core queue for selecting a single core of cores 508A-508N (collectively, "cores 508") of core group 502A, cores 518A-518N (collectively, "cores 518") of core group 502B, or cores 528A-528N (collectively, "cores 528") of core group 502C of processing unit and memory block 500 of a service PIC, such as service PIC 48 of FIG. 2, for processing packet data of a traffic flow. Core groups 502 may be examples of core groups 29 of FIG. 2 and cores 508, 518, and 528 may be examples of cores 27 of FIG. 2.

Each core group 502A-502C (collectively, "core groups 502") comprises a corresponding plurality of cores 508, 518, or 528, a corresponding one of local hash tables 504A-504C (collectively, "local hash tables 504"), and a corresponding one of packet buffers 506A-506C (collectively, "packet buffers 506"). The corresponding local hash table 504 and packet buffer 506 of each core group 502 is unique to the core group.

As depicted in FIG. 5, routing engine 44 of control plane 40 manages selection of a service PIC ID that identifies a service PIC (e.g., a service PIC 48 of FIG. 1) for processing packet fragments of a traffic flow (510). Furthermore, routing engine 44 manages selection of, e.g., core group 502A of core groups 502 and one or more cores 508 within core group 502A for processing the packet fragments of the traffic flow. After assigning the traffic flow to the selected core group 502A, routing engine 44 applies core group steering logic 512 to steer the packet fragments of the traffic flow to the selected core group 502A, where the packet fragments are stored in unique packet buffer 506A. Further, core group 502A stores, in unique local hash table 504A, a hash index for the traffic flow. As described in more detail below, the one or more cores 508 of core group 502A assigned to the traffic flow assemble, based on the hash index for the traffic flow stored by local hash table 504, fragmented packet data for the traffic flow into packets for the traffic flow.

Figure 6:
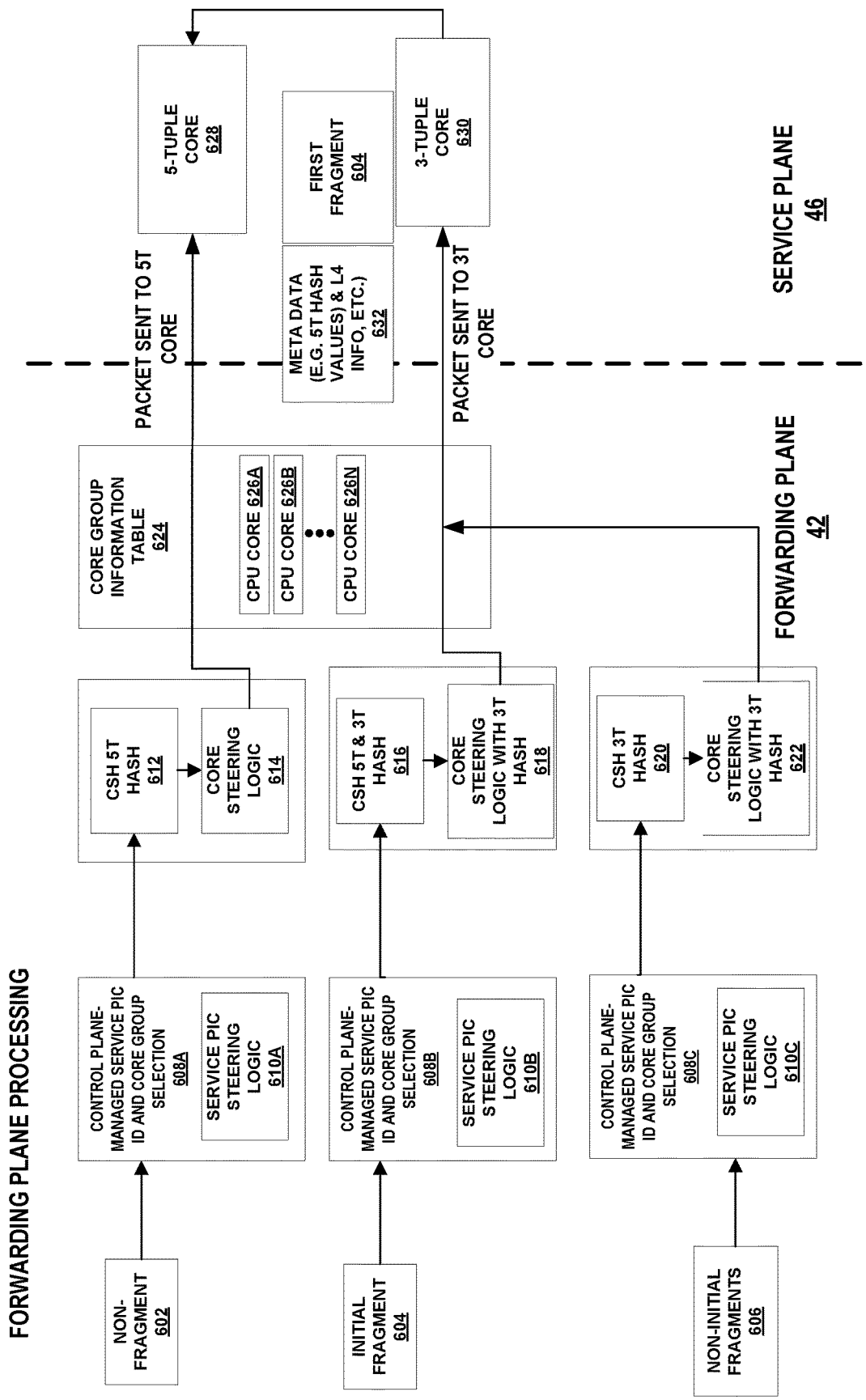
FIG. 6 is a flowchart illustrating an operation by a forwarding engine of a forwarding plane for processing packet fragments in accordance with the techniques of the disclosure.

FIG. 6 is a flowchart illustrating an operation by forwarding engine 43 of forwarding plane 42 of FIG. 2 for processing packet fragments in accordance with the techniques of the disclosure. As stated above, bidirectional traffic of each flow is sent into the same processing unit core to maintain flow affinity. For convenience, FIG. 6 is described with respect to FIG. 2.

As illustrated in FIG. 6, routing engine 44 of control plane 40 and forwarding engine 43 of forwarding plane 42 of service node 20A of FIG. 2 perform service PIC-level load balancing of traffic flows based on a Source IP address (SIP), Destination IP address (DIP), and Internet Protocol Version (e.g., IPv4 or IPv6) of the traffic flows. In other examples not depicted in FIG. 6, routing engine 44 and forwarding engine 43 perform service PIC-level load balancing with a firewall attached in an incoming Wide Area Network (WAN) interface. Routing engine 44 performs core-level load balancing based on a configuration of control plane 40 and 5-tuple information obtained from packets of the traffic flows.

In the example of FIG. 6, for a non-fragmented packet 602 of a traffic flow, routing engine 44 of control plane 40 performs control plane-managed service PIC ID and core group selection 608A to select a service PIC (e.g., service PIC 48 of FIG. 2) and core group (e.g., core group 29 of FIG. 2) for application of network services to the traffic flow. Service PIC steering logic 610A steers non-fragmented packet 602 to the selected service PIC 48 and core group 29 for processing. Forwarding engine 43 generates a 5-tuple or 7-tuple hardware (HW) checksum and hash (CSH) 612 in forwarding plane 42. As described herein, forwarding engine 43 calculates the hash and passes the hash to service PIC 48. This enables forwarding engine 43 and service PIC 48 to implement a common "hash value to core-ID" selector algorithm. The use of a core-ID selector algorithm common to forwarding engine 43 and service PIC 48 enables both fragmented and non-fragmented packets to be assigned to the same 5-tuple core 27 of service PIC 48. This common selector algorithm enables one to maintain flow pinning and/or flow affinity to a specific core 27.

Core steering logic 614 uses CSH 612 to steer non-fragmented packet 602 and CSH 612 to 5-tuple core 628 of the selected core group 29. In some examples, core steering logic 614 references core group information table 624, which stores affinity information for each processing unit core 626A-626N (collectively, "cores 626" or "processing unit cores 626") of the selected core group 29, to steer non-fragmented packet 602 and CSH 612 to 5-tuple core 628. 5-tuple core 628 is an example of one of cores 626. Cores 626 may be examples of cores 27 of FIG. 2.

As another example, for an initial packet fragment 604 of a traffic flow, routing engine 44 of control plane 40 performs control plane-managed service PIC ID and core group selection 608B to select service PIC 48 and core group 29 for application of network services to the traffic flow. Service PIC steering logic 610B steers initial packet fragment 604 to the selected service PIC 48 and core group 29 for processing. Forwarding engine 43 generates a 5-tuple CSH and a 3-tuple hash 616 in forwarding plane 42. Forwarding engine 43 uses metadata 632 (e.g., a 5-tuple hash value, L4 information, etc.) to apply core steering logic 618 to steer initial packet fragment 604 and 3-tuple hash 616 to 3-tuple core 630 of the selected core group 29. In some examples, core steering logic 618 references core group information table 624 to steer initial packet fragment 604 and 3-tuple hash 616 to 3-tuple core 630. 3-tuple core 630 is an example of one of cores 626.

As another example, for non-initial packet fragments 606 of a traffic flow, routing engine 44 of control plane 40 performs control plane-managed service PIC ID and core group selection 608C to select a service PIC and core group for application of network services to the traffic flow.

Service PIC steering logic 610C steers non-initial packet fragments 606 to the selected service PIC and core group for processing. Forwarding engine 43 generates a 3-tuple CSH 620 in forwarding plane 42. Forwarding engine 43 applies core steering logic 622 to steer non-initial fragments 606 to 3-tuple core 630 of the selected core group. In some examples, core steering logic 622 references core group information table 624 to steer non-initial packet fragments 606 to 3-tuple core 630.

3-tuple core 630 assembles initial packet fragment 604 and non-initial packet fragments 606 into non-fragmented packets and forwards the reassembled, non-fragmented packets to 5-tuple core 628. 5-tuple core 628 applies a network service to non-fragmented packets 602 and/or the reassembled, non-fragmented packets received from 3-tuple core 630 and outputs the resulting packets for the traffic flow to forwarding engine 43. Forwarding engine 43 forwards the packets for the traffic flow toward a destination of the traffic flow.

Therefore, as illustrated in the example of FIG. 6, 3-tuple core 630 performs fragmented packet reassembly within service plane 46 prior to forwarding the reassembled packets to 5-tuple core 628 for application of network services. In contrast, forwarding engine 43 sends non-fragmented packets 602 to 5-tuple core 628 for application of network services without first processing non-fragmented packets 602 with 3-tuple core 630.

Figure 7:
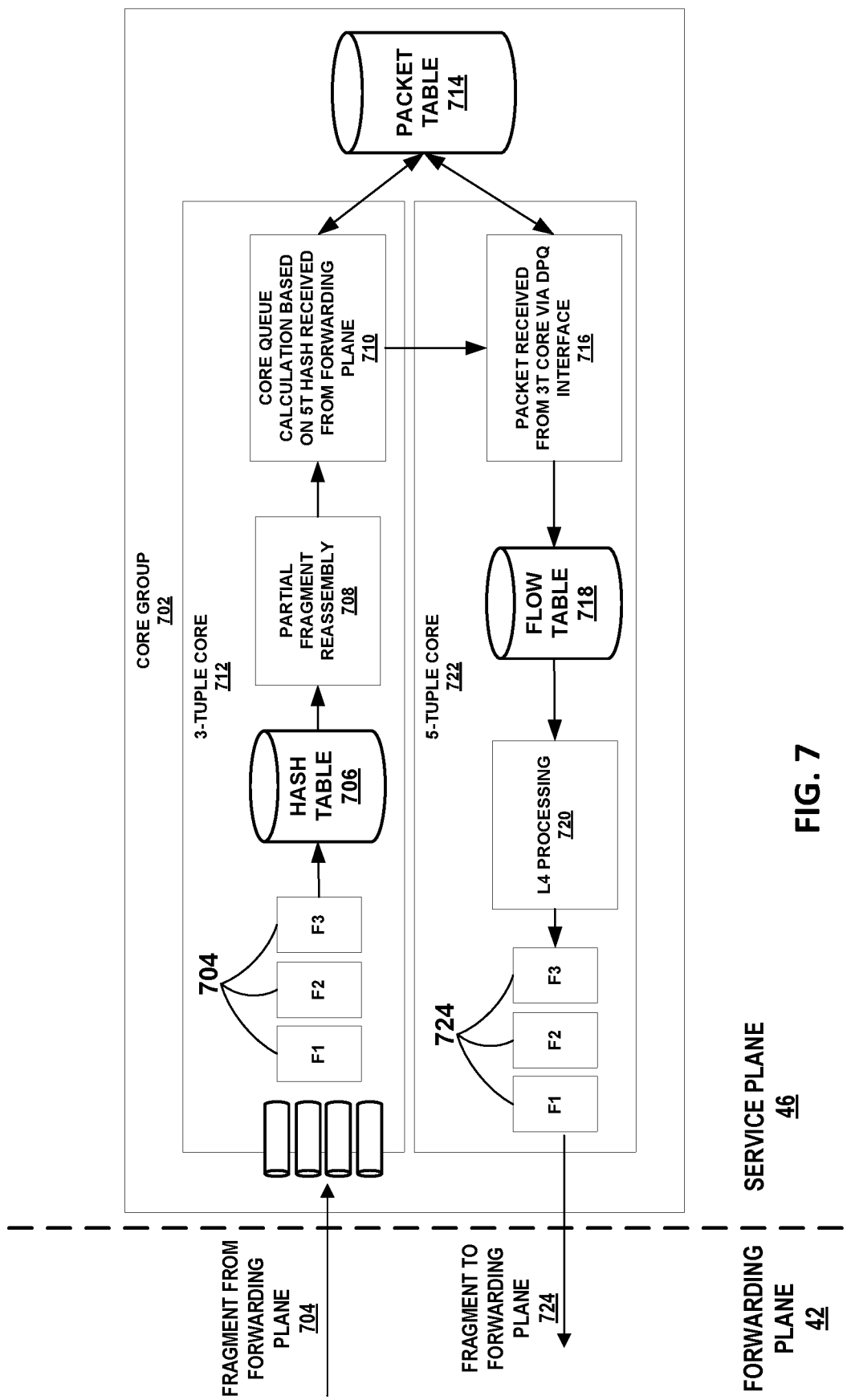
FIG. 7 is a flowchart illustrating an operation by a service plane for partial reassembly of packet fragments in accordance with the techniques of the disclosure.

FIG. 7 is a flowchart illustrating an operation by service plane 46 for partial reassembly of packet fragments 704 in accordance with the techniques of the disclosure. In the example of FIG. 7, service plane 46 comprises a core group 702. Core group 702 may be an example of one of core groups 29 of FIG. 2 or core groups 502 of FIG. 5. Core group 702 includes 3-tuple core 712 and 5-tuple core 722. 3-tuple core 712 and 5-tuple core 722 may be examples of cores 27 of service PIC 48 of FIG. 2.

Core group 702, like each individual core group 29 of service PIC 48 of FIG. 2, has a local packet buffer and hash table 706 that is unique to the core group 702, as opposed to a conventional service PIC, which may have a global packet buffer and hash table that are shared by all cores of the service PIC. In this example, all packet fragments 704 of a flow are forwarded by forwarding plane 42 to a single core, e.g., 3-tuple core 712, of core group 702. This eliminates the choke point of a conventional service PIC that is caused by the use of a global packet buffer and hash table and improves the performance of packet fragment reassembly, as well as overall packet processing performance of service PIC 48.

For applications which only need L3 and/or OSI Model Layer-4 (L4) information, core group 702 of service PIC 48 may perform partial reassembly to obtain L4 information for each fragment 704 and outputs fragments 724 out of service PIC 48. L4 information refers to information pertaining to the OSI Model Layer-4 (e.g., the Transport Layer) and comprises Transmission Control Protocol (TCP) and User Datagram Protocol (UDP) information. In some examples, the L4 information includes, e.g., a UDP port which can be passed from forwarding plane 42.

As depicted in the example of FIG. 7, 3-tuple core 712 of core group 702 of service PIC 48 receives, from forwarding plane 42, a plurality of packet fragments 702. 3-tuple core 712 stores the plurality of packet fragments 704 in hash table 706. Next, 3-tuple core 712 performs partial reassembly 708 of fragmented packet data 704 to obtain L4 information for the traffic flow associated with packet fragments 704. 3-tuple core 712 references packet table 714 to obtain a 5-tuple hash for the traffic flow associated with packet fragments 704 received from forwarding plane 42, and performs core queue calculation 710 based on the 5-tuple hash for the traffic flow associated with packet fragments 704. Based on core queue calculation 710, 3-tuple core 712 sends partially-reassembled packet fragments 704 to 5-tuple core 722 for application of network services. For example, 3-tuple core 712 obtains, from an initial packet fragment of fragmented packet data 704, an identifier for 5-tuple core 722 and forwards, based on a reference to the identifier within packet table 714, fragmented packet data 704 to 5-tuple core 722 for application of the network service.

5-tuple core 722 receives fragmented packet data 704 from 3-tuple core 712 via DQP interface 716. 5-tuple core 722 references flow table 718 to obtain L4 information for the traffic flow associated with packet fragments 704. 5-tuple core 722 applies, based on the L4 information for the traffic flow associated with packet fragments 704, one or more network services to packet fragments 704. For example, 5-tuple core 722 performs, based on the L4 information, L4 processing 720 on packet fragments 704 or applies other types of network services to packet fragments 704 to obtain packet fragments 724. After applying the network services to packet fragments 704 to obtain packet fragments 724, 5-tuple core 722 forwards packet fragments 724 to forwarding plane 42.

Figure 8:
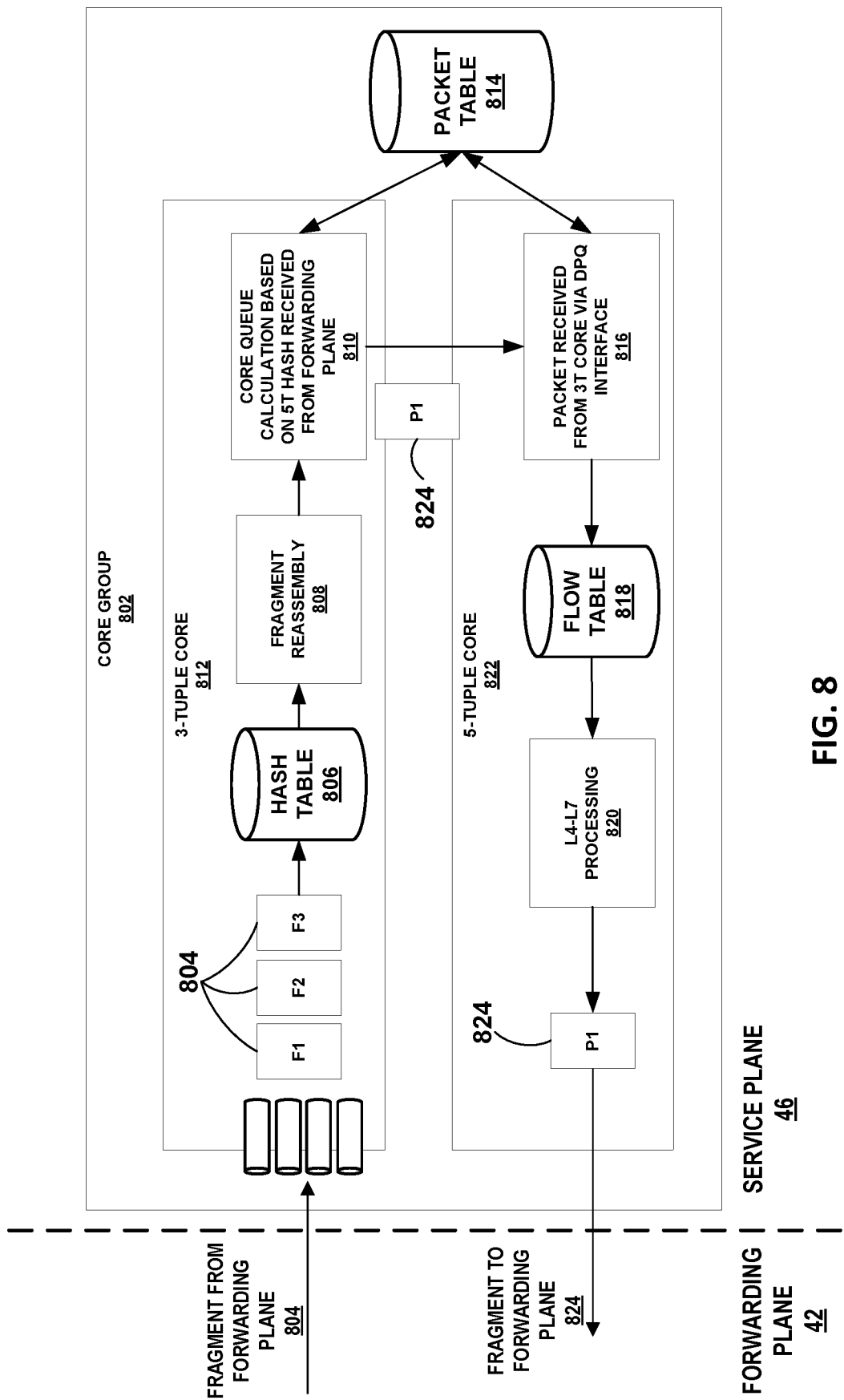
FIG. 8 is a flowchart illustrating an operation by a service plane for full reassembly of packet fragments in accordance with the techniques of the disclosure.

FIG. 8 is a flowchart illustrating an operation by a service plane for full reassembly of packet fragments in accordance with the techniques of the disclosure. In the example of FIG. 8, service plane 46 comprises a core group 802. Core group 802 may be an example of one of core groups 29 of FIG. 2 or core groups 502 of FIG. 5. Core group 802, like each individual core group of service PIC 48 of FIG. 2, has a local packet buffer and hash table, as opposed to conventional service PIC, which may have a global packet buffer and hash table that are shared by all cores of the service PIC. Core group 802 includes 3-tuple core 812 and 5-tuple core 822. 3-tuple core 812 and 5-tuple core 822 may be examples of cores 27 of service PIC 48 of FIG. 2.

Some applications require complete reassembly of packet fragments 804 in service PIC 48. For example, deep packet inspection (DPI) requires OSI Model Layer-4 to Layer-7 (L4-L7) information for the packet fragment. As described herein, L4-L7 information refers to information pertaining to the OSI Model Layer-4 (e.g., the Transport Layer), such as Transmission Control Protocol (TCP) and User Datagram Protocol (UDP) information as well as the OSI Model Layer-7 (e.g., the Application Layer). L4-L7 information may include, e.g., Internet Protocol Security (IPsec) information for the traffic flow or deep packet inspection (DPI) information for the traffic flow. IPSec acts as an IPSec tunnel endpoint to receive encrypted payloads with a fragmented tunnel IP header. As depicted in FIG. 8, service plane 40 receives flow information after parsing reassembled packet 824. However, service plane 42 may receive 5-tuple core information from forwarding plane 42 in the form of metadata.

As depicted in FIG. 8, 3-tuple core 812 of core group 802 of service PIC 48 receives all fragment packets 804 of a traffic flow from forwarding plane 42, including an initial fragment of the traffic flow. 3-tuple core 812 computes a hash index using, e.g., Source IP, Destination IP, IP Sequence ID, cookie, etc., and stores the hash index in hash table 806. If the hash index already exists, 3-tuple core 812 pushes incoming fragments 804 into a hash bucket corresponding to the hash index. If the hash index does not exist, 3-tuple core 812 creates a hash bucket corresponding to the hash index and pushes fragments 804 into the hash bucket.

Next, 3-tuple core 812 performs complete fragment reassembly 808 of fragments 804 to obtain reassembled packets 824 (e.g., non-fragmented packet data) and to obtain L4-L7 information for a traffic flow associated with fragments 804. In some examples, the L4-L7 information for the traffic flow comprises Internet Protocol Security (IPsec) information for the traffic flow. In some examples, the L4-L7 information for the traffic flow comprises deep packet inspection (DPI) information for the traffic flow.

After 3-tuple core 812 completes packet fragment reassembly 808, 3-tuple core 812 looks up an ID for 5-tuple core 822 of core group 802 from metadata of the initial packet fragment of fragments 804 received from forwarding plane 42. For example, 3-tuple core 812 obtains, using metadata of an initial packet fragment of fragments 804, an identifier for 5-tuple core 822 and forwards, based on a reference to the identifier within packet table 814, reassembled packet data 824 to 5-tuple core 822 for application of the network service. 3-tuple core 812 sends reassembled packets 824 to 5-tuple core 814 via a DPQ interface 816. In some examples, 3-tuple core 812 sends reassembled packets 824 directly to a transmit queue (TX-Q) for 5-tuple core 822 to avoid overloading 5-tuple core 822. The TX-Q of 5-tuple core 822 sends reassembled packets 824 to a PFE for 5-tuple core 822.

5-tuple core 822 receives reassembled packets 824 from 3-tuple core 812 via DPQ interface 816. 5-tuple core 822 references flow table 818 to obtain L4-L7 information for the traffic flow associated with packets 824. 5-tuple core 822 performs, based on the L4-L7 information for the traffic flow associated with packets 824, L4-L7 network processing 820 to apply one or more network services to packets 824. In some examples, 5-tuple core 822 may apply any remaining service operations as well. For example, 5-tuple core 822 handles session creation/deletion, status counters, and periodic events such as timeout event handling. This mechanism preserves the thread affinity of packet fragments 804. As a result, the techniques set forth in FIG. 8 avoid cache/memory cross-pollination. After applying the network services to reassembled packets 824, 5-tuple core 822 forwards reassembled packets 824 to forwarding plane 42.

In some examples, the maximum transmission unit (MTU) between service plane 46 and forwarding plane 42 is less than the size of reassembled packets 824. In such an example, 5-tuple core 822 may be required to output a fragmented packet to forwarding plane 42 to ensure than the outputted data is less than the MTU. In such an example, 5-tuple core 822 re-fragments packets 824 (not depicted in the example of FIG. 8) prior to forwarding re-fragmented packets 824 to forwarding plane 42.

Figure 9:
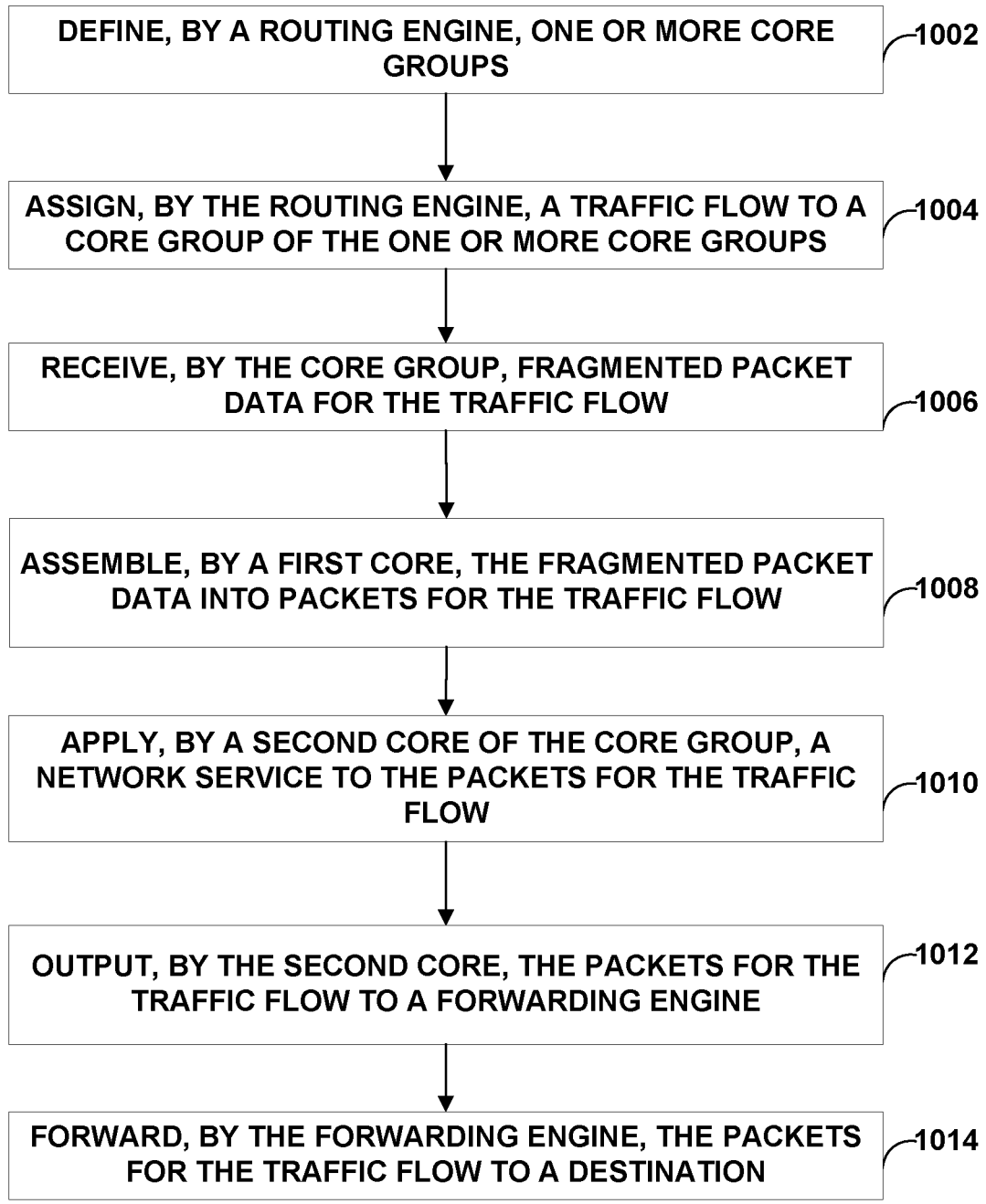
FIG. 9 is a flowchart illustrating an example operation for processing packet fragments, wherein packet fragment reassembly occurs on a service plane, in accordance with the techniques of the disclosure.

FIG. 9 is a flowchart illustrating an example operation for processing packet fragments, wherein packet fragment reassembly occurs on a service plane, in accordance with the techniques of the disclosure. For convenience, the operation of FIG. 9 is described with respect to service node 20A of FIG. 2, core group 702 of FIG. 7, which performs partial reassembly of fragmented packet data, and core group 802 of FIG. 8, which performs complete reassembly of fragmented packet data.

As depicted in the example of FIG. 9, routing engine 44 operating in control plane 40 defines one or more core groups 29 comprising one or more cores 27 of at least one processing unit 25 of service PIC 48 (1002). For example, core group 29 comprises at least one 3-tuple core (e.g., 3-tuple core 712 of FIG. 7 or 3-tuple core 812 of FIG. 8) and at least one 5-tuple core (e.g., 5-tuple core 722 of FIG. 7 or 5-tuple core 822 of FIG. 8). Routing engine 44 assigns a traffic flow to core group 29 (1004). Core group 29, e.g., the core group of service PIC 48 to which the traffic flow is assigned, receives fragmented packet data (e.g., fragmented packet data 704 of FIG. 7 or fragmented packet data 804 of FIG. 8) for the traffic flow (1006).

A first core of core group 29 (e.g., a 3-tuple core) assembles the fragmented packet data into packet data (1008). With respect to FIG. 8, for example, 3-tuple core 812 performs complete reassembly of fragmented packet data 804 to assemble fragmented packet data 804 into packets 824. 3-tuple core 812 forwards the packet data 804 to 5-tuple core 822. As another example, with respect to FIG. 7, for example, 3-tuple core 712 performs partial reassembly of fragmented packet data 704 to obtain metadata for the fragmented packet data and forwards fragmented packet data 704 to 5-tuple core 722.

A second core of core group 29 (e.g., a 5-tuple core) applies a network service to the packets for the traffic flow (1010). For example, 5-tuple core 722 of FIG. 7 applies a network service to fragmented packet data 704. As another example, 5-tuple core 822 of FIG. 8 applies a network service to packets 824. After applying the network service, the 5-tuple core of core group 29 outputs the packets for the traffic flow to forwarding engine 43 operating in forwarding plane 42 (1012). Forwarding engine 43 forwards the packets for the traffic flow to a destination of the traffic flow (1014).

Figure 10A:
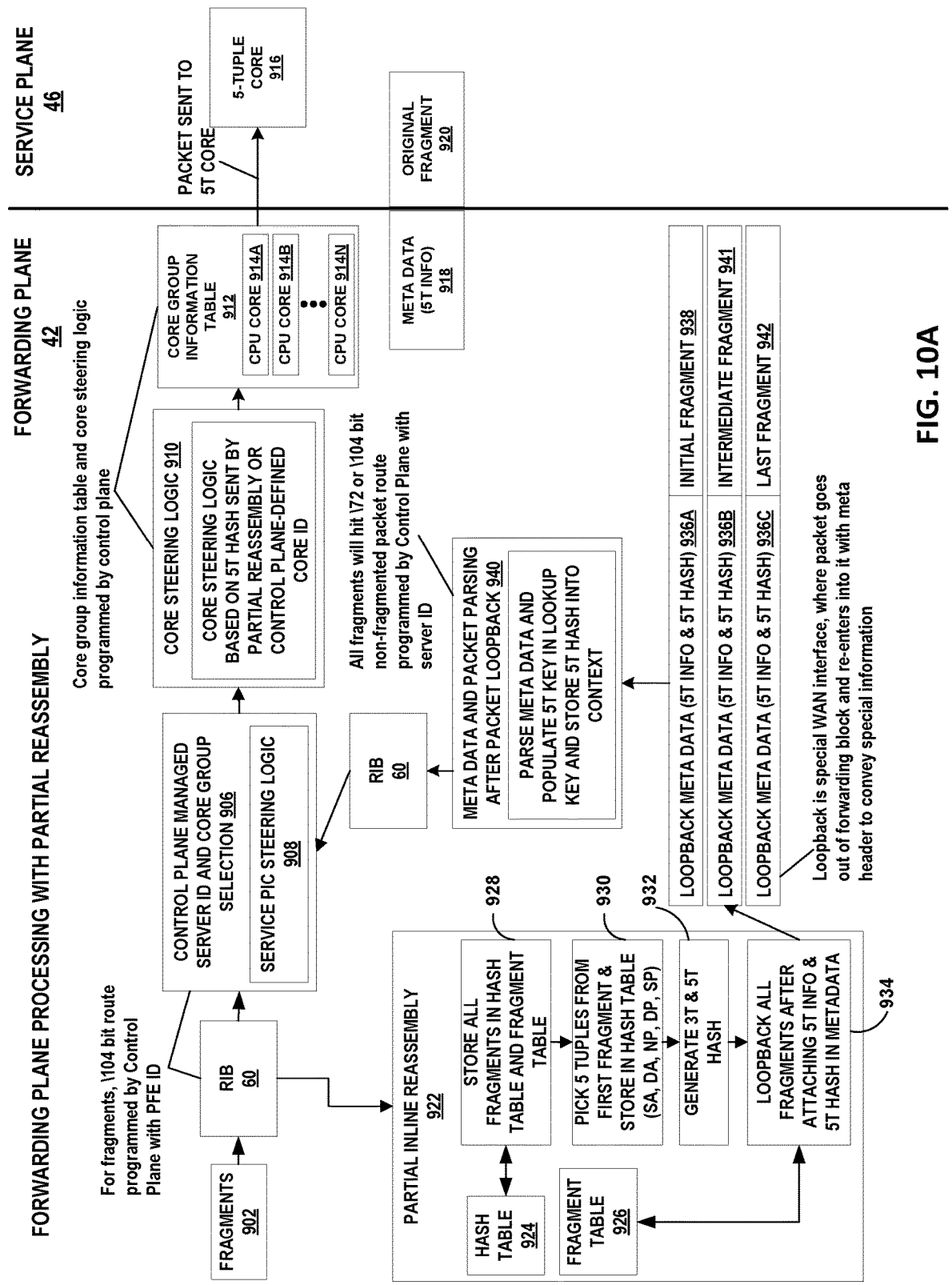
FIG. 10A is a flowchart illustrating an operation for processing packet fragments, wherein partial fragment reassembly occurs on a forwarding plane, in accordance with the techniques of the disclosure.

FIG. 10A is a flowchart illustrating an operation for processing packet fragments 902, wherein partial fragment reassembly occurs on forwarding plane 42, in accordance with the techniques of the disclosure. Specifically, FIG. 10A depicts a control plane-assisted flow affinity model for packet fragments. Partial reassembly of packet fragments 902 occurs in forwarding plane 42, and forwarding plane 42 sends all packet fragments 902 and non-fragments to 5-tuple core 916 of a core group (e.g., core group 29 of FIG. 2) to which a traffic flow corresponding to packet fragments 902 is assigned. In this implementation, service plane 46 does not need to redirect fragments from a 3-tuple core to a 5-tuple core because fragment reassembly is performed by forwarding plane 42, thereby obviating the need for a 3-tuple core.

As depicted in FIG. 10A, forwarding plane 42 performs partial reassembly of packet fragments 902. Forwarding plane 42 cross references received packet data to RIB 60. In some examples, forwarding engine 43 performs a fragment check of the received packet data, which includes examining the IPv4 header of the packet for the presence of the Fragment Offset and More Fragment (MF) flags. If the packet is a fragment, forwarding engine 43 sets, the source port and destination port fields of the route lookup key corresponding to the packet stored by RIB 60 to zero. Example routes used in the operation of FIG. 10A are set forth below:

Non-Fragmented route: \104 bits: SIP, DIP, NextProto, Sport=Non-Zero, Dport=Non-Zero (Symmetric).

Normal Fragment route: \104 bits: SIP, DIP, NextProto, Sport=0, Dport=0 (Symmetric).

Partially Reassembled fragment route: \104 bits: SIP, DIP, NextProto, Sport=Non-Zero, Dport=Non-Zero (Symmetric).

IPSec tunnel route: \104 bits: SIP, DIP, NextProtocol (e.g., ESP or AH), SPI.

For packet fragments 902, control plane 40 programs a \104 bit route with a PFE ID that identifies a specific PFE (e.g., a specific instance of forwarding engine 43). In some examples, a first PFE corresponding to the specified PFE ID performs route-lookup before forwarding the packet to a second PFE. The second PFE performs fragment reassembly. This may enable forwarding plane 42 to distribute the processing load if there are too many fragments arriving on a particular PFE (e.g., such as an ingress PFE), thereby avoiding degrading the performance of that ingress PFE.

Forwarding plane 42 performs partial inline reassembly 922 of fragmented packet data 902. For example, forwarding plane 42 stores all fragments in hash table 924 and fragment table 926 (928). Forwarding plane 42 picks 5-tuple data from an initial fragment of fragmented packet data 902 and stores the 5-tuple data in hash table 924 (930). The 5-tuple data comprises a source address, a source port, a destination address, a destination port, and a network protocol. Where IPSec is used, the 5-tuple may specify an SPI instead of a source port and destination port. Further, where IPSec is used, the protocol specifies a next protocol, such as ESP or AH. Forwarding plane 42 generates, from the 5-tuple data and fragmented packet data 902, a 3-tuple hash and a 5-tuple hash for a traffic flow corresponding to the fragmented packet data 902 (932). Partial reassembly does not reassemble fragments into single packets. Rather, partial reassembly collects 5-tuple information from an initial fragment, generates a 5-tuple and/or 7-tuple hash, and passes the hash to all other fragments of the traffic flow such that the other fragments are treated as non-fragmented packets.

Forwarding plane 42 transmits metadata including the 5-tuple information and the 5-tuple hash with fragmented packet data 902 to an internal WAN loopback channel of the same forwarding plane 42 so as to retransmit fragmented packets 902 as new, non-fragmented packets (934). The loopback channel is a WAN interface where a packet is transmitted out of the forwarding plane and re-enters into the forwarding plane with a metadata header that conveys special information. For example, for an initial fragment 938 of fragmented packet data 902, forwarding plane 42 attaches loopback metadata 936A that comprises 5-tuple information and a 5-tuple hash to initial fragment 938 and transmits metadata 936A and initial fragment 938 to an internal WAN loopback channel of the same forwarding plane 42. As another example, for a non-initial (e.g., intermediate) fragment 941 of fragmented packet data 902, forwarding plane 42 attaches loopback metadata 936B that comprises 5-tuple information and a 5-tuple hash to non-initial fragment 941 and transmits metadata 936B and non-initial fragment 941 to an internal WAN loopback channel of the same forwarding plane 42. As another example, for a non-initial (e.g., last) fragment 942 of fragmented packet data 902, forwarding plane 42 attaches loopback metadata 936C that comprises 5-tuple information and a 5-tuple hash to non-initial fragment 942 and transmits metadata 936C and non-initial fragment 942 to an internal WAN loopback channel of the same forwarding plane 42.

Forwarding plane 42 performs route lookup of partially reassembled packets via RIB 60 to obtain a \104 non-fragmented route for a traffic flow associated with packet fragments 902. Forwarding plane 42 uses metadata and packet parsing 940 to assist route lookup. The \104 bit non-fragmented route enables forwarding plane 42 to obtain a destination service PIC, core group, and core_id information. Metadata and packet parsing 940 copies L4 information for fragmented packets 902 into a lookup key for the route. Route lookup assists control-plane managed service PIC ID and core group selection 906 with a service PIC ID and core group ID so as to enable service PIC steering logic 908 to select a service PIC 48 for processing a traffic flow corresponding to the route. For example, the route lookup operation obtains a 5-tuple hash for selecting 5-tuple core 916 from other cores 27 of core group 29 of service PIC 48.

Core steering logic 910 performs core steering based on a 5-tuple hash obtained by partial reassembly (or via the use of a control-plane defined core ID). For example, core steering logic 910 uses core group information table 912 to steer non-fragmented packets to one of processing unit cores 914A-914N (collectively, "cores 914" or "processing unit cores 914"). Cores 914 may be examples of cores 27 of FIG. 2. In the example of FIG. 10A, core steering logic 910 selects 5-tuple core 916 from core group information table 912 and causes routing plane 42 to send the non-fragmented packets to 5-tuple core 916. 5-tuple core 916 is an example of cores 914. As described above, non-fragmented packets sent to 5-tuple core 916 comprise metadata (5-tuple information) 918 and original fragment data 920. 5-tuple core 916 applies one or more network services to the non-fragmented packets and sends the non-fragmented packets back to forwarding plane 42 for forwarding toward a destination of the traffic flow associated with fragmented packet data 902.

Figure 10B:
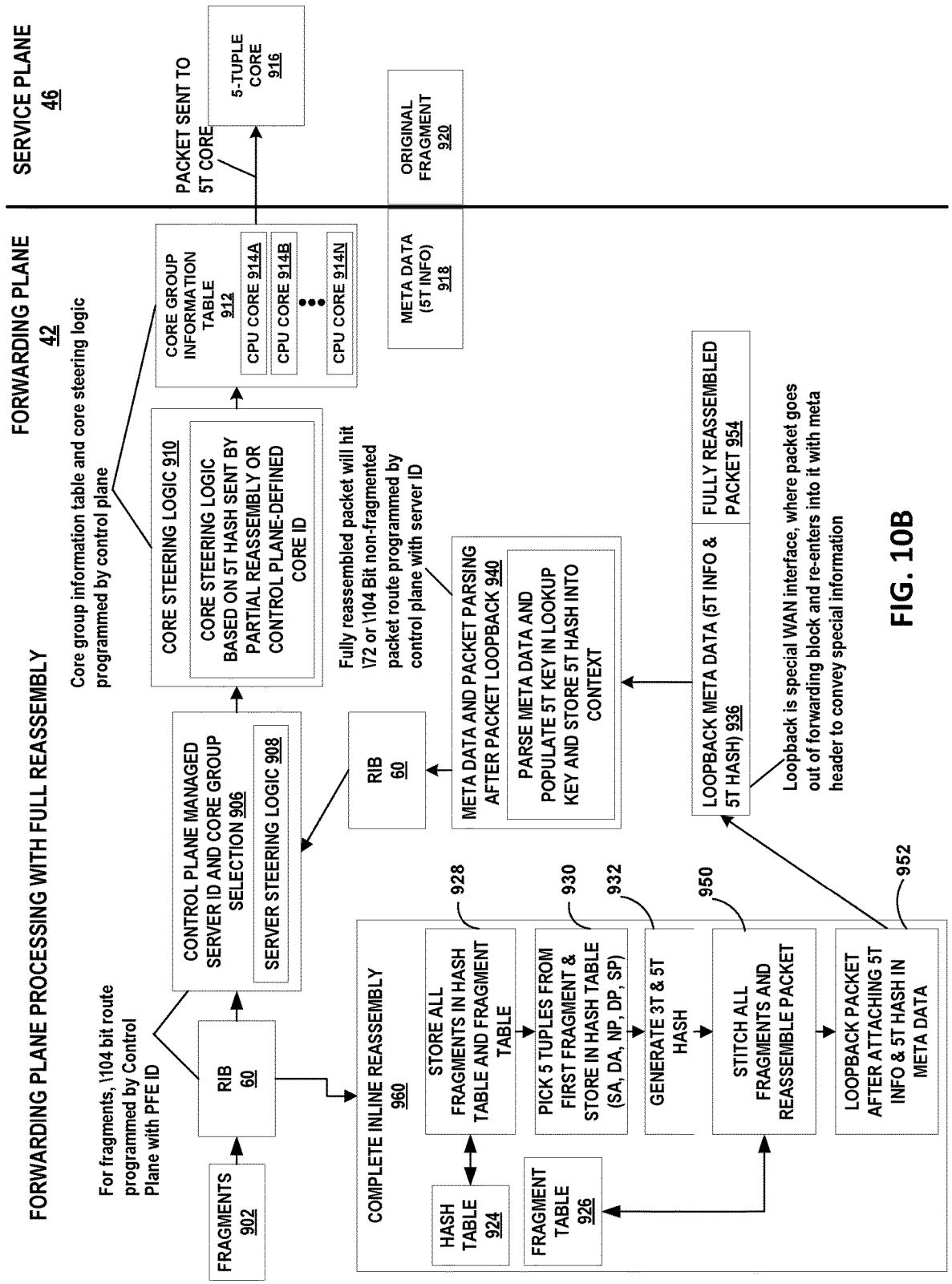
FIG. 10B is a flowchart illustrating an operation for processing packet fragments, wherein full fragment reassembly occurs on a forwarding plane, in accordance with the techniques of the disclosure.

FIG. 10B is a flowchart illustrating an operation for processing packet fragments, wherein full fragment reassembly occurs on a forwarding plane, in accordance with the techniques of the disclosure. The operation depicted in FIG. 10B may operate in a substantially similar fashion to the operation depicted in FIG. 10A. However, as depicted in FIG. 10B, the forwarding plane performs full reassembly of packet fragments 902.

As depicted in FIG. 10B, forwarding plane 42 performs full reassembly of packet fragments 902. Forwarding plane 42 cross references received packet data to routing table 902. Example routes used in the operation of FIG. 10B are set forth below:

Non-Fragmented route: \104 bits: SIP, DIP, NextProto, Sport=Non-Zero, Dport=Non-Zero (Symmetric).

Normal Fragment route: \104 bits: SIP, DIP, NextProto, Sport=0, Dport=0 (Symmetric).

Partially Reassembled fragment route: \104 bits: SIP, DIP, NextProto, Sport=Non-Zero, Dport=Non-Zero (Symmetric).

IPSec tunnel route: \104 bits: SIP, DIP, NextProto, SPI.

Forwarding plane 42 performs full inline reassembly 960 of fragmented packet data 902. For example, forwarding plane 42 stores all fragments in hash table 924 and fragment table 926 (928). A route lookup of packet fragments results in \104 bit fragment steering routes (e.g., source address, destination address, networking protocol, source port=0, destination port=0). Forwarding plane 42 picks 5-tuple data from an initial fragment of fragmented packet data 902 and stores the 5-tuple data as a new hash table entry in hash table 924 (930). The 5-tuple data comprises a source address, a source port, a destination address, a destination port, and a network protocol. Forwarding plane 42 generates, from the 5-tuple data and fragmented packet data 902, a 3-tuple hash and/or a 5-tuple hash for a traffic flow corresponding to the fragmented packet data 902 (932). As an example, the metadata may include the below information:

[apptype(3)|hash/key flag(1)|metadata (L4 lookup_key & 5-tuple hash_value(64 bits))]

Forwarding plane 42 stitches together each of fragmented packets 902 to reassemble fragmented packets 902 into non-fragmented packets (950). After attaching 5-tuple information and a 5-tuple hash in the metadata of the non-fragmented packets, forwarding plane 42 performs a loopback operation so as to retransmit fragmented packets 902 as new, non-fragmented packets (952). For example, for a fully reassembled packet 954, forwarding plane 42 attaches loopback metadata 936 that comprises 5-tuple information and a 5-tuple hash. Therefore, forwarding plane 42 loops back fragmented packet data 902 to forwarding plane 42 to attach the metadata header to fragmented packet data 902.

Forwarding plane 42 performs route lookup of reassembled packets in RIB 60 to obtain a \104 non-fragmented route for a traffic flow associated with fragmented packet data 902. Forwarding plane 42 uses metadata and packet parsing 940 to assist route lookup. Metadata and packet parsing 940 copies L4 information for fragmented packets 902 into a lookup key for the route. Route lookup assists control-plane managed service PIC ID and core group selection 906 with a service PIC ID and core group ID so as to enable control plane-managed service PIC ID and core group ID selection logic 908 for the traffic flow corresponding to the route. For example, the route lookup operation obtains a 5-tuple hash for selecting 5-tuple core 916 from other cores of the core group of service PIC 48.

To program the forwarding plane, control plane 40 publishes core group selector information per application to forwarding plane 42. Control plane 40 also programs service PIC selector information. Control plane 40 installs \104 bit fragment steering routes (e.g., source address, destination address, networking protocol, source port=0, destination port=0) to steer packet fragments to complete inline reassembly 860 in forwarding plane 42.

Control plane 40 installs \104 bit non-fragments routes (e.g., source address, destination address, networking protocol, source port, destination port) for non-fragmented packets. Control plane 40 also programs corresponding service PIC selector information. In some examples, control plane 40 allows forwarding plane 42 to determine a 5-tuple core (e.g., 5-tuple core 916) from other cores 914 of the core group based on the hash of 5-tuple and/or 7-tuple information from the packet. Forwarding plane 42 determines, inflight, whether to schedule a packet to a high priority core queue or a low priority core queue.

For the full fragment reassembly depicted in the example of FIG. 10B, forwarding plane 42 transmits the whole reassembled packet 954 with metadata 936 to an internal WAN address of forwarding plane 42. Next, forwarding plane 42 performs metadata parsing 940 as described above with respect to FIG. 10A. However, in the example of FIG. 10B, forwarding plane 42 treats all fragments 902 as non-fragmented packets because the fragments have 5-tuple information and a 5-tuple hash. In this fashion, forwarding plane 42 sends all fragments and non-fragments to the selected 5-tuple core 916. Accordingly, using the techniques set forth herein, service PIC 48 is able to maintain 5-tuple core affinity for each of the packets of a traffic flow, including for packet fragments.

Using the techniques described above, service plane 46 does not need to perform IP reassembly. Further, service plane 46 does not need to redirect fragments from a 3-tuple core to the 5-tuple core. In this fashion, service plane 46 may eliminate one hop between cores (e.g., from a 3-tuple core to a 5-tuple core), thereby significantly improving the performance of service PIC 48.

Figure 11:
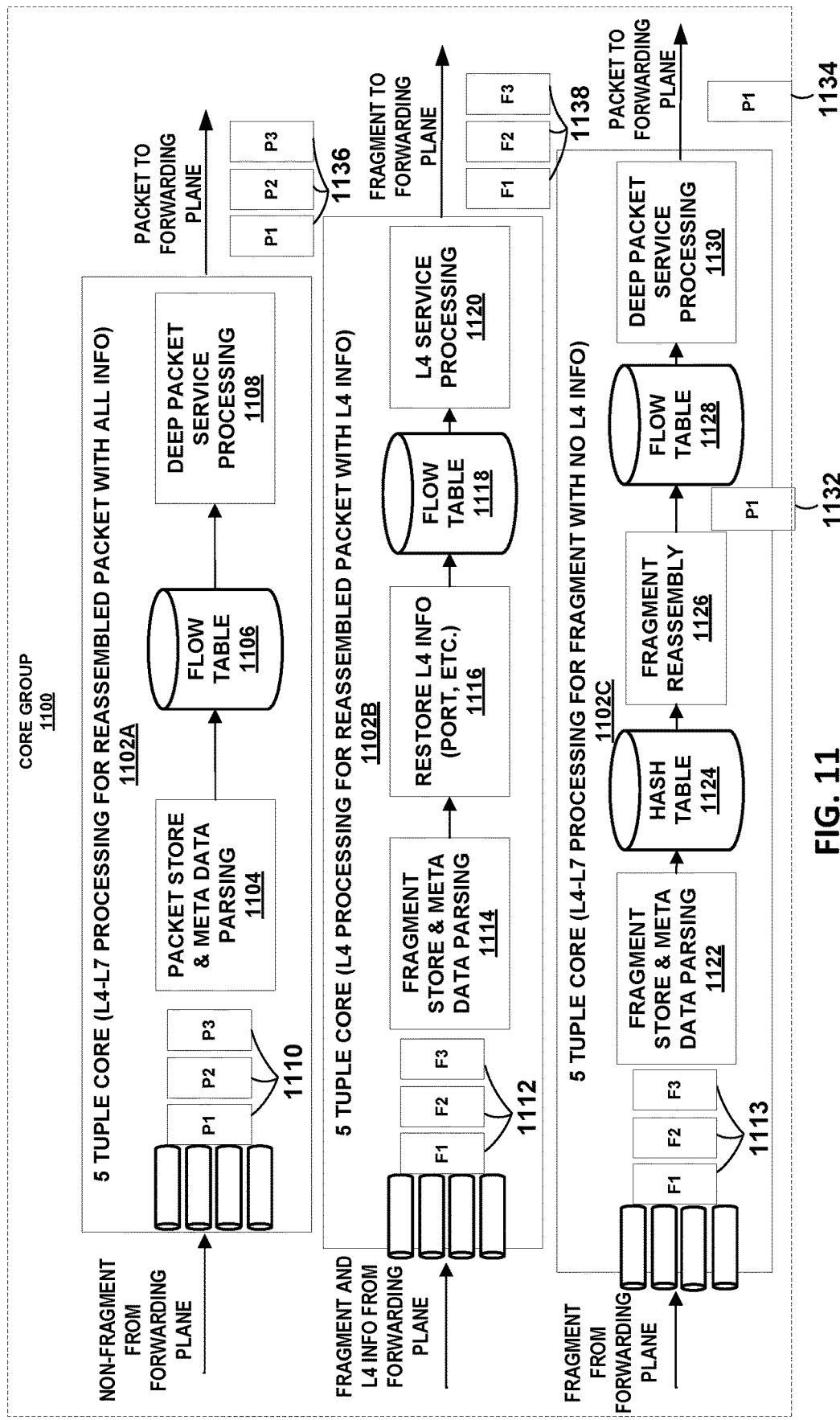
FIG. 11 is a flowchart illustrating an operation for processing packet data by a service plane, wherein packet fragment reassembly occurs on a forwarding plane, in accordance with the techniques of the disclosure.

FIG. 11 is a flowchart illustrating an operation for processing packet data by service plane 46, wherein packet fragment reassembly occurs on forwarding plane 42 of FIG. 2, in accordance with the techniques of the disclosure. The example operation of FIG. 11 may occur within service plane 46 after the example operations illustrated in FIG. 10A or 10B occur within forwarding plane 42 to perform packet fragment reassembly.

As described herein, cores 1102A-1102C (hereinafter, "cores 1102") of core group 1100 share a local packet buffer and hash table, as opposed to all of the cores of a service PIC sharing the same global packet buffer and hash table. Further, as described herein, there is no redirection of packets from a 3-tuple core to a 5-tuple core because forwarding plane 42 of FIG. 2 performs packet reassembly (as illustrated in FIGS. 10A and 10B), and thereafter sends all fragments into 5-tuple cores 1102 only, thereby obviating the need for a 3-tuple core. Cores 1102 may be examples of cores 27 of FIG. 2, and core group 1100 may be an example of core group 29 of FIG. 2.

During packet processing by the service plane, three scenarios can happen. In the first scenario, the forwarding plane completely reassembles packet fragments into non-fragmented packets 1110. Here, the service plane-to-forwarding plane connectivity may receive bigger packets. In this case, service plane 46 processes packets 1110 as normal, non-fragmented packets. This is the ideal scenario which caters to all applications. In this example, 5-tuple core 1102A receives non-fragmented packets 1110, stores non-fragmented packets 1110, and performs metadata parsing of non-fragmented packets 1110 (1104). 5-tuple core 1102A uses metadata of non-fragmented packets 1110 to query flow table 1106 for a traffic flow corresponding to non-fragmented packets 1110. 5-tuple core 1102A applies one or more network services, such as deep packet service processing 1108, to non-fragmented packets 1110 to obtain serviced packets 1136. After applying the network services, 5-tuple core 1102A forwards serviced packets 1136 to forwarding plane 42 for forwarding toward a destination of serviced packets 1136 (e.g., a destination of non-fragmented packets 1110).

In the second scenario, forwarding plane 42 partially reassembles packet fragments to obtain L4 information. In this scenario, the service plane-to-forwarding plane connectivity channel may not receive bigger packets. Therefore, service plane 44 receives fragmented packets 1112 together with L4 information copied into metadata. Service plane 44 using this L4 information to apply services to fragments 1112. In this example, 5-tuple core 1102B receives fragmented packet data 1112, stores fragmented packet data 1112, and performs metadata parsing of fragmented packet data 1112 (1114). 5-tuple core 1102B uses the metadata to restore L4 information (e.g., source port, destination port, etc.) to fragmented packet data 1112 (1116). 5-tuple core 1102B uses the L4 information of fragmented packet data 1112 to query flow table 1118 for a traffic flow corresponding to fragmented packet data 1112. 5-tuple core 1102B applies one or more network services, such as L4 service processing 1120, to fragmented packet data 1112 to obtain serviced packet fragment data 1138. After applying the network services, 5-tuple core 1102B forwards serviced packet fragment data 1138 to forwarding plane 42 for forwarding toward a destination of serviced packet fragment data 1138 (e.g., a destination of fragmented packet data 1112).

In the third scenario, forwarding plane 42 partially reassembles packet fragments to obtain L4-L7 information. In this example, the service plane-to-PFE connectivity channel cannot receive bigger packets. Therefore, service plane 46 receives fragmented packet data 1113 together with L4 information as metadata. However, because service plane 46 desires L4-L7 information, forwarding plane 42 performs full reassembly of fragmented packet data 1113. This may be required for particular services, such as IPSec Tunnels, encrypted packets, or DPI. In this example, 5-tuple core 1102C receives fragmented packet data 1113, stores fragmented packet data 1113, and performs metadata parsing of fragmented packet data 1113 (1122). 5-tuple core 1102C uses the L4 information to obtain a 5-tuple hash for fragmented packet data 1113 (1124). Further, 5-tuple core 1102C uses the L4 information and the 5-tuple hash for fragmented packet data 1113 to forwarding plane 42 to reassemble fragmented packet data 1113 into non-fragmented packets 1132 (1126). 5-tuple core 1102C uses the L4-L7 information of fragmented packet data 1113 to query flow table 1128 for a traffic flow corresponding to fragmented packet data 1113. 5-tuple core 1102C applies one or more network services, such as deep packet service processing 1130, to non-fragmented packets 1132 to obtain serviced packets 1134. After applying the network services, 5-tuple core 1102C forwards serviced packets 1134 to forwarding plane 42 for forwarding toward a destination of serviced packets 1134 (e.g., a destination of fragmented packet data 1113).

Figure 12:
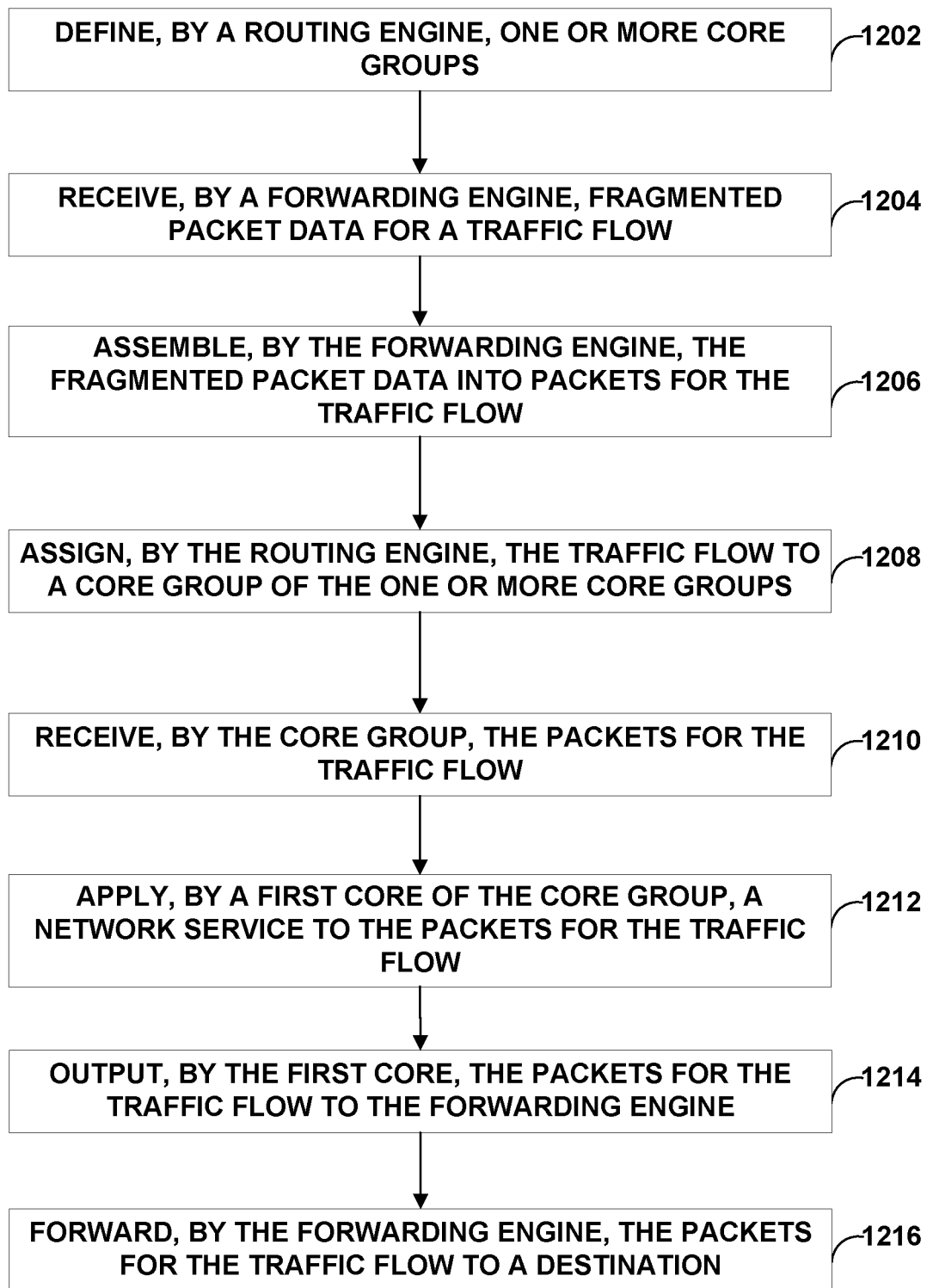
FIG. 12 is a flowchart illustrating an example operation for processing packet fragments, wherein packet fragment reassembly occurs on a forwarding plane, in accordance with the techniques of the disclosure.

In some examples, packet fragment data 1112, 1113 comprises an initial packet fragment and one or more non-initial packet fragments. In some examples, 5-tuple cores 1102 partially assemble packet fragment data 1112, 1113 to obtain L4 information for the traffic flow such that 5-tuple cores 1102 may use the L4 information for the traffic flow to apply, based on the L4 information, one or more network services to the partially assembled packet fragment data 1112, 1113. In some examples, 5-tuple cores 1102 fully assemble packet fragment data 1112, 1113 to obtain L4-L7 information for the traffic flow such that 5-tuple cores 1102 may use the L4-L7 information for the traffic flow to apply, based on the L4-L7 information, one or more network services to the fully assembled packet fragment data 1112, 1113. In some examples, the L4-L7 information for the traffic flow comprises Internet Protocol Security (IPsec) information for the traffic flow. In some examples, the L4-L7 information for the traffic flow comprises deep packet inspection (DPI) information for the traffic flow FIG. 12 is a flowchart illustrating an operation for processing packet fragments, wherein packet fragment reassembly occurs on a forwarding plane, in accordance with the techniques of the disclosure. For convenience, the operation of FIG. 12 is described with respect to service node 20A of FIG. 2, forwarding plane 42 and service plane 46 of FIGS. 10A-10B, and core group 1100 of FIG. 11.

As depicted in the example of FIG. 12, routing engine 44 operating in control plane 40 defines one or more core groups 29 comprising one or more cores 27 of at least one processing unit 25 of service PIC 48 (1202). For example, core group 29 comprises at least one 5-tuple core (e.g., 5-tuple cores 1102 of FIG. 12).

Forwarding engine 43 operating in forwarding plane 42 receives fragmented packet data for a traffic flow (1204). Forwarding engine 43 assembles the fragmented packet data for the traffic flow into packets for the traffic flow (1206). For example, as depicted in FIG. 10A, forwarding plane 42 performs partial assembly of the fragmented packet data to obtain metadata for the fragmented packet data. As depicted in FIG. 10B, forwarding plane 42 performs complete assembly of the fragmented packet data to assemble the fragmented packet data into packets for the traffic flow. Routing engine 44 assigns the traffic flow corresponding to the fragmented packet data to a core group 29 of the one or more core groups 29 (1208). For example, routing engine 44 assigns the traffic flow corresponding to the fragmented packet data to core group 1100 of FIG. 11.

Core group 1100, e.g., the core group to which the traffic flow is assigned, receives the packets for the traffic flow (1210). A first core of core group 1100 (e.g., one of 5-tuple cores 1102) applies a network service to the packets for the traffic flow (1212). After applying the network service, the first core of core group 1100 outputs the packets for the traffic flow to forwarding engine 43 operating in forwarding plane 42 (1214). Forwarding engine 43 forwards the packets for the traffic flow to a destination of the traffic flow (1216).

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

What is claimed is:

1. A method comprising:
defining, by a routing engine operating in a control plane of a network device and executing on processing circuitry of the network device, one or more core groups, wherein the network device comprises at least one service physical interface card (PIC) implementing a service plane for the network device, wherein the service PIC of the network device comprises at least one processing unit, wherein the at least one processing unit comprises a plurality of cores, wherein each core group comprises a subset of the plurality of cores of the at least one processing unit of the service PIC, and wherein the subset of the plurality of cores of the core group comprises at least a first core and a second core;
assigning, by the routing engine, a traffic flow to a core group of the one or more core groups;

receiving, by the core group of the service PIC to which the traffic flow is assigned, fragmented packet data for the traffic flow;

assembling, by the first core of the core group to which the traffic flow is assigned, the fragmented packet data for the traffic flow into packets for the traffic flow;

applying, by the second core of the core group to which the traffic flow is assigned, a network service to the packets for the traffic flow;

outputting, by the second core of the core group, the packets for the traffic flow to a forwarding engine operating in a forwarding plane of the network device after applying the network service to the packets for the traffic flow, wherein the forwarding engine executes on the processing circuitry; and forwarding, by the forwarding engine, the packets for the traffic flow to a destination of the traffic flow.

2. The method of claim 1, wherein the first core of the core group comprises a 3-tuple core and the second core of the core group comprises a 5-tuple core, wherein the method further comprises:

identifying, by the 3-tuple core and based on the fragmented packet data for the traffic flow, the 5-tuple core; and after assembling the fragmented packet data for the traffic flow into packets for the traffic flow, forwarding, by the 3-tuple core, the packets for the traffic flow to the 5-tuple core, and wherein applying the network service to the packets for the traffic flow comprises:

obtaining, by the 5-tuple core, 5-tuple data for the traffic flow, the 5-tuple data comprising:
a source address;
a destination address;
one of a source port and destination port or a security port index (SPI); and
a protocol for the traffic flow; and applying, by the 5-tuple core and based on the 5-tuple data, the network service to the packets for the traffic flow.

3. The method of claim 1, wherein the fragmented packet data comprises an initial packet fragment for a packet of the traffic flow, and wherein assigning the traffic flow to the core group of the one or more core groups comprises:

obtaining, from the initial packet fragment, 5-tuple data or 7-tuple data; and assigning, based on the 5-tuple data or the 7-tuple data, the traffic flow to the core group.

4. The method of claim 1, wherein the fragmented packet data comprises a non-initial packet fragment for a packet of the traffic flow, and wherein assigning the traffic flow to the core group of the one or more core groups comprises:

obtaining, from the non-initial packet fragment, Layer-3 (L3) data; and identifying, based on the L3 data, the core group of the service PIC to which the traffic flow is assigned.

5. The method of claim 1, wherein the traffic flow comprises a first traffic flow, and wherein the method further comprises:

assigning, by the routing engine, a second traffic flow to the core group of the one or more core groups;

receiving, by the core group to which the second traffic flow is assigned, non-fragmented packets for the second traffic flow; and applying, by the second core of the core group to which the second traffic flow is assigned, the network service to the non-fragmented packets for the second traffic flow without processing the non-fragmented packets for the second traffic flow with the first core of the core group to which the second traffic flow is assigned.

6. The method of claim 1, wherein assembling the fragmented packet data for the traffic flow into packets for the traffic flow comprises partially assembling the fragmented packet data for the traffic flow to obtain Layer-4 (L4) information for the traffic flow, and wherein applying the network service to the packets for the traffic flow comprises applying, based on the L4 information, the network service to the packets for the traffic flow.

7. The method of claim 1, wherein assembling the fragmented packet data for the traffic flow into packets for the traffic flow comprises fully assembling the fragmented packet data for the traffic flow to obtain Layer-4 to Layer-7 (L4-L7) information for the traffic flow, and wherein applying the network service to the packets for the traffic flow comprises applying, based on the L4-L7 information, the network service to the packets for the traffic flow.

8. The method of claim 1, wherein each core group of the one or more core groups comprises a unique hash table and a unique packet buffer, and wherein assembling the fragmented packet data for the traffic flow into packets for the traffic flow comprises:

storing, in the unique hash table of the core group to which the traffic flow is assigned, a hash index for the traffic flow; and assembling, based on the hash index for the traffic flow, the fragmented packet data for the traffic flow into packets for the traffic flow.

9. A method comprising:

defining, by a routing engine operating in a control plane of a network device and executing on processing circuitry of the network device, one or more core groups, wherein the network device comprises at least one service physical interface card (PIC) implementing a service plane for the network device, wherein the service PIC of the network device comprises at least one processing unit, wherein the at least one processing unit comprises a plurality of cores, wherein each core group comprises a subset of the plurality of cores of the at least one processing unit of the service PIC, and wherein the subset of the plurality of cores of the core group comprises at least a first core and a second core;

assigning, by the routing engine, a traffic flow to a core group of the one or more core groups;

receiving, by the core group of the service PIC to which the traffic flow is assigned, fragmented packet data for the traffic flow;

obtaining, by the first core of the core group to which the traffic flow is assigned and from an initial packet fragment of the fragmented packet data, an identifier for the second core of the core group;

assembling, by the first core of the core group, the fragmented packet data for the traffic flow into packets for the traffic flow;

forwarding, by the first core of the core group and based on the identifier, the packets for the traffic flow to the second core of the core group; and applying, by the second core of the core group to which the traffic flow is assigned, a network service to the packets for the traffic flow.

10. A method comprising:

defining, by a routing engine operating in a control plane of a network device and executing on processing circuitry of the network device, one or more core groups, wherein the network device comprises at least one service physical interface card (PIC) implementing a service plane for the network device, wherein the service PIC of the network device comprises at least one processing unit, wherein the at least one processing unit comprises a plurality of cores, wherein each core group comprises a subset of the plurality of cores of the at least one processing unit of the service PIC, and wherein the subset of the plurality of cores of the core group comprises at least a first core;

receiving, by a forwarding engine operating in a forwarding plane of the network device and executing on the processing circuitry, fragmented packet data for a traffic flow;

assembling, by the forwarding engine, the fragmented packet data for the traffic flow into packets for the traffic flow;

assigning, by the routing engine, the traffic flow to a core group of the one or more core groups;

receiving, by the core group to which the traffic flow is assigned, the packets for the traffic flow;

applying, by the first core of the core group to which the traffic flow is assigned, a network service to the packets for the traffic flow;

outputting, by the first core of the core group, the packets for the traffic flow to the forwarding engine after applying the network service to the packets for the traffic flow; and forwarding, by the forwarding engine, the packets for the traffic flow to a destination of the traffic flow.

11. The method of claim 10, wherein the fragmented packet data comprises an initial packet fragment for a packet of the traffic flow, and wherein assigning the traffic flow to the core group of the one or more core groups comprises:
  obtaining, from the initial packet fragment, 5-tuple data or 7-tuple data; and
  assigning, based on the 5-tuple data or the 7-tuple data, the traffic flow to the core group.

12. The method of claim 10, wherein the fragmented packet data comprises a non-initial packet fragment for a packet of the traffic flow, and wherein assigning the traffic flow to the core group of the one or more core groups comprises:
  obtaining, from the non-initial packet fragment, Layer-3 (L3) data; and
  identifying, based on the L3 data, the core group of the service PIC to which the traffic flow is assigned.

13. The method of claim 10, wherein assembling the fragmented packet data for the traffic flow into packets for the traffic flow comprises partially assembling the fragmented packet data for the traffic flow to obtain Layer-4 (L4) information for the traffic flow, and wherein applying the network service to the packets for the traffic flow comprises applying, based on the L4 information, the network service to the packets for the traffic flow.

14. The method of claim 10, wherein assembling the fragmented packet data for the traffic flow into packets for the traffic flow comprises fully assembling the fragmented packet data for the traffic flow to obtain Layer-4 to Layer-7 (L4-L7) information for the traffic flow, and wherein applying the network service to the packets for the traffic flow comprises applying, based on the L4-L7 information, the network service to the packets for the traffic flow.

15. The method of claim 10, wherein assembling the fragmented packet data for the traffic flow into packets for the traffic flow comprises:
  transmitting, to an internal Wide Area Network (WAN) channel of the network device, the fragmented packet data to attach a metadata header to the fragmented packet data; and
  assembling, based on the metadata header, the fragmented packet data for the traffic flow into packets for the traffic flow, and wherein assigning the traffic flow to the core group of the one or more core groups comprises:
  generating, based on the metadata header and the packets for the traffic flow, a 5-tuple hash for the traffic flow; and
  assigning, based on the 5-tuple hash, the traffic flow to the core group of the one or more core groups.

16. The method of claim 10:

wherein the first core of the core group comprises a 5-tuple core, and wherein applying the network service to the packets for the traffic flow comprises:
  obtaining, by the 5-tuple core, 5-tuple data for the traffic flow, the 5-tuple data comprising:
    a source address;
    a destination address;
    one of a source port and destination port or a security port index (SPI); and
    a protocol for the traffic flow; and
  applying, by the 5-tuple core and based on the 5-tuple data, the network service to the packets for the traffic flow.

17. The method of claim 10, wherein each core group of the one or more core groups comprises a unique hash table and a unique packet buffer.

18. A network device comprising:

processing circuitry configured to execute a routing engine operating in a control plane and a forwarding engine operating in a forwarding plane; and at least one service physical interface card (PIC) implementing a service plane for the network device, wherein the service PIC of the network device comprises at least one processing unit, and wherein the at least one processing unit comprises a plurality of cores, wherein the routing engine is configured to define one or more core groups, wherein each core group comprises a subset of the plurality of cores of the at least one processing unit of the service PIC, and wherein the subset of the plurality of cores of the core group comprises at least a first core, wherein the forwarding engine is configured to receive fragmented packet data for a traffic flow;

wherein the forwarding engine is further configured to assemble the fragmented packet data for the traffic flow into packets for the traffic flow, wherein the routing engine is configured to assign the traffic flow to a core group of the one or more core groups, wherein the core group to which the traffic flow is assigned is configured to receive the packets for the traffic flow, and wherein the first core of the core group to which the traffic flow is assigned is configured to:
  apply a network service to the packets for the traffic flow; and
  output the packets for the traffic flow to the forwarding engine after applying the network service to the packets for the traffic flow, and wherein the forwarding engine is further configured to forward the packets for the traffic flow to a destination of the traffic flow.

\* \* \* \* \*